United States Patent
Cirillo et al.

(10) Patent No.: US 12,172,526 B2
(45) Date of Patent: Dec. 24, 2024

(54) VEHICLE WITH ELECTRICAL TRACTION INCLUDING AN ENERGY MANAGEMENT SYSTEM, AND METHOD FOR MANAGING THE ENERGY IN SUCH A VEHICLE WITH ELECTRICAL TRACTION

(71) Applicant: HITACHI RAIL STS S.P.A., Naples (IT)

(72) Inventors: Francesco Cirillo, Naples (IT); Simone Di Lella, Naples (IT); Giuseppe Graber, Naples (IT); Luigi Iengo, Naples (IT); Roberta Schiavo, Naples (IT)

(73) Assignee: HITACHI RAIL STS S.p.A., Naples (IT)

( * ) Notice: Subject to any disclaimer, the term of this patent is extended or adjusted under 35 U.S.C. 154(b) by 260 days.

(21) Appl. No.: 17/797,974

(22) PCT Filed: Feb. 10, 2021

(86) PCT No.: PCT/IB2021/051087
§ 371 (c)(1),
(2) Date: Aug. 5, 2022

(87) PCT Pub. No.: WO2021/161191
PCT Pub. Date: Aug. 19, 2021

(65) Prior Publication Data
US 2023/0057202 A1    Feb. 23, 2023

(30) Foreign Application Priority Data

Feb. 10, 2020   (IT) .................. 102020000002566

(51) Int. Cl.
*B60L 1/12*       (2006.01)
*B60L 9/18*       (2006.01)
(Continued)

(52) U.S. Cl.
CPC ............... *B60L 1/12* (2013.01); *B60L 9/18* (2013.01); *B60L 50/11* (2019.02); *B60L 50/13* (2019.02);
(Continued)

(58) Field of Classification Search
CPC ........... B60L 1/12; B60L 50/30; B60L 58/20; B60L 15/20; B60L 5/36; B60L 7/26;
(Continued)

(56) References Cited

U.S. PATENT DOCUMENTS 5,816,358 A * 10/1998 Adler ................... B60L 50/30
  180/282
6,127,621 A * 10/2000 Simburger ............. H02J 3/38
  136/246

(Continued)

FOREIGN PATENT DOCUMENTS

| JP | 2018174646 A | 11/2018 |
| JP | 6441343 B2 | 12/2018 |
| WO | 2013114546 | 5/2015 |

OTHER PUBLICATIONS

Italian Search Report and Written Opinion in IT Application No. 2020000002566, mailed Jul. 8, 2020 (an English translation is attached herewith) (9 pages).

(Continued)

*Primary Examiner* — Yuri Kan
(74) *Attorney, Agent, or Firm* — Leason Ellis LLP

(57) ABSTRACT

A vehicle has an electric traction chain to supply a drive torque to the wheels, and an energy management system comprising: a generator set configured to generate a first supply voltage and mechanically disconnected from the wheels in every operating condition; a battery storage assembly configured to generate a second supply voltage; a control unit that implements operative conditions of the vehicle, including: (i) powering the electrical traction chain (Continued)

with the first supply voltage; (ii) powering the electrical traction chain with the second supply voltage; (iii) recharging the storage assembly with a network voltage external to the vehicle and coming from a catenary; (iv) recharging the storage assembly with the first supply voltage; and (v) recharging the storage assembly with a recovered voltage generated by the traction chain operating as an electrical generator.

13 Claims, 12 Drawing Sheets

(51) Int. Cl.
  *B60L 50/11* (2019.01)
  *B60L 50/13* (2019.01)
  *B60L 50/61* (2019.01)
  *B60R 16/03* (2006.01)
(52) U.S. Cl.
  CPC .............. *B60L 50/61* (2019.02); *B60R 16/03* (2013.01); *B60L 2210/12* (2013.01); *B60L 2210/14* (2013.01)
(58) Field of Classification Search
  CPC ...... B60L 50/61; B60L 50/16; B60L 15/2045; H02J 3/38; H02J 3/381; H02J 50/12; H02J 7/345; E04H 6/22; F03D 7/048; H01M 4/386; G01R 21/1333; H03H 7/40; B60M 7/00; G01F 23/68; H02M 5/272
  See application file for complete search history.

(56) References Cited

U.S. PATENT DOCUMENTS

| | | | | |
|---|---|---|---|---|
| 10,144,294 | B2* | 12/2018 | Fratelli | H02J 7/345 |
| 2004/0119454 | A1* | 6/2004 | Chang | H02M 5/272 |
| | | | | 323/284 |
| 2005/0024217 | A1* | 2/2005 | Sabatino | G01F 23/68 |
| | | | | 340/618 |
| 2006/0005736 | A1* | 1/2006 | Kumar | B60L 15/2045 |
| | | | | 105/1.4 |
| 2006/0132085 | A1* | 6/2006 | Loubeyre | B60L 50/16 |
| | | | | 320/104 |
| 2010/0065349 | A1 | 3/2010 | Ichikawa | |
| 2010/0076636 | A1 | 3/2010 | Ichikawa | |
| 2011/0094841 | A1* | 4/2011 | Mazumdar | B60M 7/00 |
| | | | | 191/33 R |
| 2011/0309793 | A1 | 12/2011 | Mitsutani | |
| 2013/0146411 | A1* | 6/2013 | Hendrickson | B60L 50/61 |
| | | | | 191/33 R |
| 2013/0221744 | A1* | 8/2013 | Hall | H03H 7/40 |
| | | | | 307/9.1 |
| 2014/0265555 | A1* | 9/2014 | Hall | H02J 50/12 |
| | | | | 307/9.1 |
| 2015/0008674 | A1 | 1/2015 | Keita | |
| 2015/0115703 | A1* | 4/2015 | Hatanaka | B60L 7/26 |
| | | | | 307/9.1 |
| 2016/0152129 | A1* | 6/2016 | West | B60L 5/36 |
| | | | | 180/65.21 |
| 2016/0178678 | A1* | 6/2016 | Pelletier | G01R 21/1333 |
| | | | | 700/291 |
| 2017/0267105 | A1* | 9/2017 | Fratelli | B60L 15/20 |
| 2018/0159120 | A1* | 6/2018 | Hirama | H01M 4/386 |
| 2018/0166881 | A1* | 6/2018 | Suryanarayana | H02J 3/381 |
| 2019/0085824 | A1* | 3/2019 | Gupta | F03D 7/048 |
| 2019/0366868 | A1* | 12/2019 | Tseng | E04H 6/22 |
| 2021/0146792 | A1* | 5/2021 | Lehn | B60L 58/20 |

OTHER PUBLICATIONS

International Search Report and Written Opinion in PCT Application No. PCT/IB2021/051087, mailed May 19, 2021 (15 pages).
Japanese Office Action in JP Application No. 2022-548500, mailed Aug. 5, 2024 (6 pages), an English Translation is attached hereto.

* cited by examiner

VEHICLE WITH ELECTRICAL TRACTION INCLUDING AN ENERGY MANAGEMENT SYSTEM, AND METHOD FOR MANAGING THE ENERGY IN SUCH A VEHICLE WITH ELECTRICAL TRACTION

CROSS-REFERENCE TO RELATED APPLICATIONS

This patent application is a U.S. National Phase Application under 35 U.S.C. § 371 of International Patent Application No. PCT/IB2021/051087, filed on Feb. 10, 2021, which claims priority from Italian patent application no. 102020000002566, filed on Feb. 10, 2020, the entire disclosure of which is incorporated herein by reference.

TECHNICAL FIELD

The present invention relates to a vehicle with electrical traction including an energy management system, and to an energy management method in such a vehicle with electrical traction.

BACKGROUND ART

Trains provided with traction by a thermal engine and by electrical traction powered by a catenary, capable of proceeding both on electrified lines and on non-electrified lines, are particularly appreciated for their flexibility compared to those provided only with thermal engines, as they are capable of running with the use of fuel only on non-electrified routes. In fact, the need for low environmental impact solutions is increasingly felt, especially to reduce $CO_2$ emissions when the fuel used by said vehicles is diesel.

With this perspective, battery storage systems can be used to store electricity on-board the vehicle when the external power line is present, and use this energy when the railway vehicle moves on non-electrified routes, to power the same completely or partially (that is, in addition to fuel supply). The use of different on-board energy sources also allows the development of railway vehicles with advanced functionality.

The external power line (e.g., catenary or third rail) is any line suitable for electrically powering a generic vehicle with electrical traction (hereinafter generically referred to as "electric vehicle") and defined by part of an electricity supply infrastructure, in particular for railway or streetcar vehicles.

It is known to use rechargeable batteries ("stack") to provide energy to an electrical load in the case, for example, of unexpected interruption of the electricity supply, or in general for back-up applications. It is also known to recharge said batteries by means of the energy released during the braking of the vehicle itself.

Document US2016152129A1 discloses a vehicle having an electric drive including three possible kinds of power supply: electric power supply from catenary, electric power supply from batteries, and electric power supply from an electric motor-generator. A thermal engine is provided that mechanically drives both the electric motor-generator and an axle of the vehicle.

Document US2006005736A1 discloses a vehicle including a primary energy source, an energy storage system and an external charging source connected so as to supply electric power to a traction drive for propelling the vehicle. An energy management system includes an energy management processor for determining a power storage parameter and a power transfer parameter. The energy storage system selectively stores electrical energy as a function of the power storage parameter and selectively supplies electric power as a function of the power transfer parameter.

DISCLOSURE OF INVENTION

The aim of the present invention is to provide a vehicle with electrical traction including an energy management system, and an energy management method in a vehicle with electrical traction, capable of increasing the flexibility of the electric vehicle and of obtaining new operating modes with respect to the known art.

According to the present invention, a vehicle with electrical traction including an energy management system, and an energy management method of a vehicle with electrical traction are provided, as defined in the attached claims.

BRIEF DESCRIPTION OF THE DRAWINGS

For a better understanding of the present invention, preferred embodiments are now described, purely by way of non-limiting example, with reference to the attached drawings, wherein.

BEST MODE FOR CARRYING OUT THE INVENTION

According to the present invention, a power management system is provided (for traction and for recharging) for a vehicle with electrical traction (hereinafter referred to as "electric vehicle"), in particular of the railway or streetcar type, even more particularly a rail vehicle such as a railway vehicle. In the following, reference will therefore be made indifferently to an electric vehicle, a rail vehicle or a streetcar vehicle without thereby losing generality.

Figure 1:
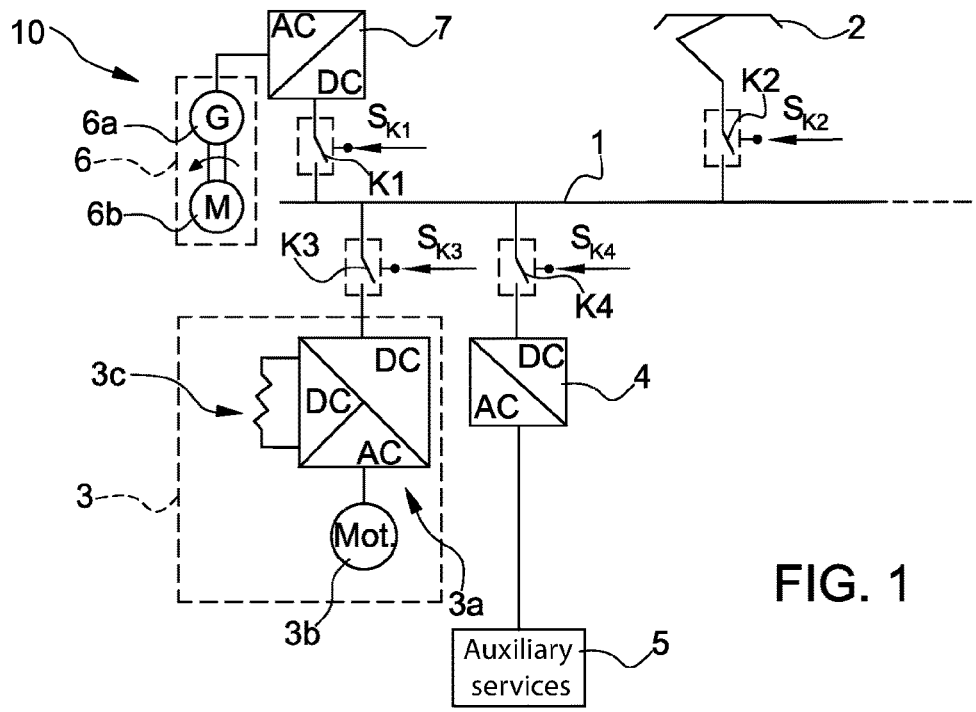
FIG. 1 shows an energy management system of a vehicle with electrical traction, according to an embodiment known to the present Applicant.

FIG. 1 schematically shows a power supply system 10 for a vehicle with electrical traction (in particular a rail or a streetcar) of the type known to the Applicant. The vehicle with electrical traction comprises a traction drive 3, including: an inverter 3a, in particular a three-phase inverter, for converting a DC electric power into a three-phase AC electric power for the electric motor 3b; the electric motor 3b, powered by means of the AC electric power supplied by the inverter 3a; and a brake resistor whose power level is regulated by a DC/DC converter, 3c (also known as "braking chopper"), designed for dissipating braking energy in the form of heat in the event that said energy cannot be fed into the DC bus 1 and/or stored. The traction drive 3 provides propulsion to the wheels 103 of the vehicle (FIG. 20) and is therefore designed to generate a driving torque of the vehicle itself.

Additional electrical loads (auxiliary loads, or services) 5 are also part of the vehicle and include, for example, an air conditioning system, lights, on-board computer, etc.).

The power supply system 10 comprises:

- a local main power supply line (hereinafter referred to as "DC bus") 1, configured to transfer a DC electric power supply to the vehicle, in particular to power the traction drive 3 of the vehicle (electric motor 3b) and any loads or auxiliary services 5;
- a pantograph 2, configured to be coupled to an external power supply line (a catenary 104, as in FIG. 20, or even a third rail, grounded or laterally arranged) at high voltage, to withdraw DC electric energy from such line and make it available to the vehicle, even when the latter is moving, by feeding the DC electric energy towards the DC bus 1;
- an auxiliary services converter 4, configured to convert the DC electric power from the DC bus 1 into AC or DC electric power at a lower voltage and usable by the loads or auxiliary services 5 of the vehicle;
- a generator set or engine-generator 6, comprising a combustion engine (thermal engine, in particular a diesel fuel engine) 6a and an electric generator (alternator) 6b, coupled to one another in an axial manner. The engine-generator 6 produces three-phase AC electrical power as output; and
- an electronic AC/DC converter 7, of the bi-directional kind, operatively coupled between the engine-generator 6 and the DC bus 1, to convert the three-phase AC power generated by the engine-generator 6 into DC electric power, and vice-versa to supply electric energy to the engine-generator 6 and operate the generator 6b as an electric motor.

The power supply system 1 further comprises a plurality of switches K1-K4, in particular bi-directional switches, implemented for example in the form of contactors, contactors, TRIACs, non-manually operated electro-mechanical devices designed for withstanding currents in conditions of high power, or solid-state devices. Alternatively, the K1-K4 switches can be made with semiconductor technology such as, for example, MOSFET or IGBT. In general, the term "switches" refers to electrical or electronic or electromechanical elements capable of interrupting or establishing an electric current path through the same.

In detail:

- the switch K1 is electrically coupled between the output of the AC/DC electronic converter 7 and the DC bus 1, operable to connect/disconnect the electronic converter AC/DC 7 to/from the DC bus 1;
- switch K2 is electrically coupled between the pantograph 2 and the DC bus 1, operable to connect/disconnect the pantograph 2 to/from the DC bus 1;
- the switch K3 is electrically coupled between the traction drive 3 and the DC bus 1, operable to connect/disconnect the traction drive 3 to/from the DC bus 1; and
- the switch K4 is electrically coupled between the auxiliary services converter 4 and the DC bus 1, operable to connect/disconnect the auxiliary services converter 4 to/from the DC bus 1.

During the use of the vehicle, when the catenary 104 is present, the pantograph 2 is controlled so as to couple to the catenary 104 and receive from the latter an electric voltage to power the electric motor 3b (vehicle in traction). In this operative condition, switches K2 and K3 are closed (conducting), so that the power supply can flow from the catenary 104 towards the DC bus 1 and, from the latter, towards the electric motor 3b through the three-phase inverter 3a; the switch K4 is also controlled in the closed state, so that the power supply can flow from the DC bus 1 towards the auxiliary services 5 that request it, through the auxiliary services converter 4.

During the vehicle braking phase, when the catenary 104 is present, the pantograph 2 is controlled so as to couple to the catenary 104, or kept coupled to the catenary 104. However, in this operative condition, a power supply of the electric motor 3b is not required which, on the contrary, operates as a current generator by recovering energy. The current generated by the electric motor during braking is transferred to the DC bus 1 and used by the auxiliary services 5 which request it, and/or fed into the catenary 104 to be made available to the line and/or dissipated by the braking chopper. In this operative condition, switches K2 and K3 are closed, so that power can flow from the electric motor 3b to the DC bus 1 and, from the latter, to the catenary 104. In addition, the switch K4 is controlled in the closed state, so that the power supply can flow from the DC bus 1 to the auxiliary services 5 that request it, through the auxiliary services converter 4.

As stated above, the combustion engine 6a coupled to the electric generator 6b, implements a power supply unit, additional with respect to the catenary 104, having the function of replacing the catenary 104 for the generation of electrical energy suitable to power the electric motor 3b, in particular when the catenary 104 is not present (for example in sections where, due to urban and environmental choices, the catenary 104 is not available), or it does not supply electricity (for example, due to a malfunction).

During the traction phase of the vehicle, when the power supply to the electric motor 3b is powered solely by the engine-generator 6, the switch K2 is open, in order to disconnect the DC bus 1 from the catenary 104; instead, the switches K1 and K3 are closed, so as to connect both the engine-generator 6 and the traction drive 3 to the DC bus 1. In addition, the switch K4 is also closed, in order to power the auxiliary services 5 that require operation.

In this context, during the vehicle braking phase, the energy generated by the electric motor 3b is supplied to the DC bus 1 and used by the auxiliary services 5, if necessary. However, since the catenary 104 is disconnected from the DC bus 1 (as it is not present or not working), it is not possible to distribute the excess energy on the catenary 104. In this case, any excess energy is dissipated by the braking resistor 3c.

Figure 2:
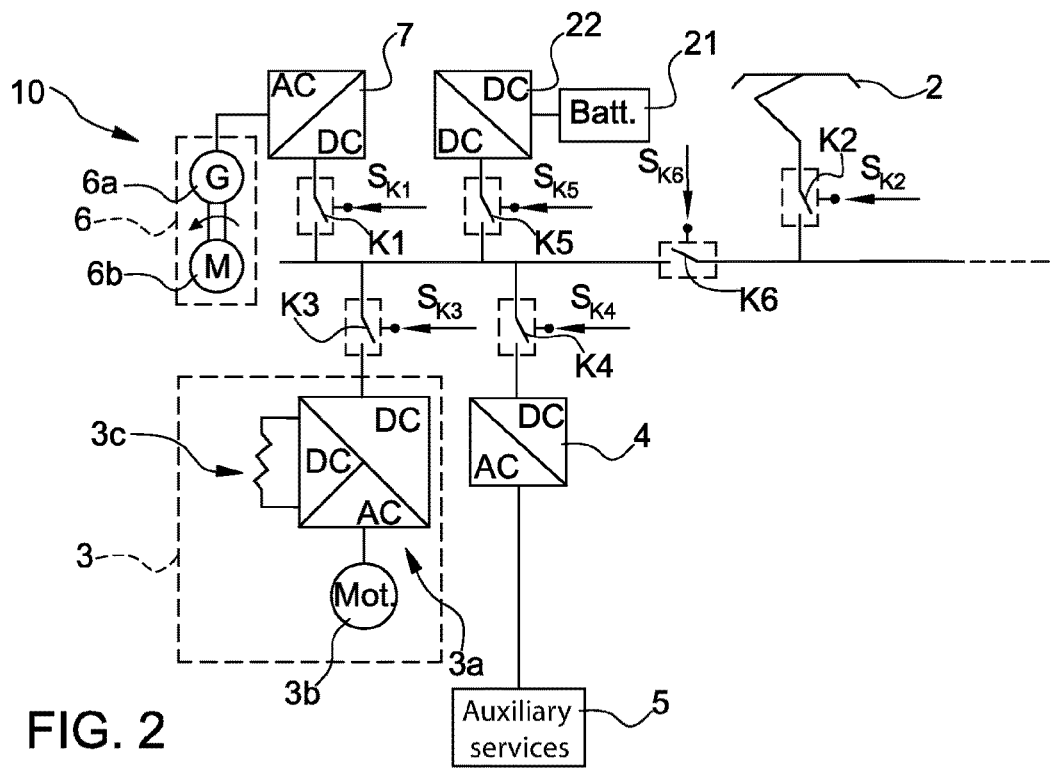
FIG. 2 shows an energy management system for a vehicle with electrical traction, according to an embodiment of the present invention.

FIG. 2 illustrates a power supply system 20 according to an aspect of the present invention.

Common elements of the power supply system 20 with the power supply system 10 are identified with the same reference numbers and not further described.

The power supply system 20 includes, in addition to what is described with reference to the power supply system 10:

- a storage system, including a rechargeable battery storage assembly (battery pack 21), including one or more battery modules or cells (in any available technology, e.g., lithium, lead, NiCd, NiMH, ZEBRA or others still), connected in series and/or parallel to one another, configured to store energy and provide power useful for traction of the vehicle, for given distances (for example, a few hundred meters or a few kilometres long) or even to integrate the power supplied by the engine-generator in moments when it was not enough. The rechargeable battery modules also allow the storage of the braking energy of the vehicle;

a bidirectional DC/DC electronic converter 22, connected between the DC bus 1 and the battery pack 21, configured to raise the voltage supplied by the battery pack 21 to the voltage value of the DC bus 1 (alternatively, it is possible to use two unidirectional DC-DC converters, for example one of the boost type and the other of the buck type or both of the buck-boost type).

In addition to what has been described above, it should be noted that the number of storage cells of the battery pack 21 is chosen according to the amount of energy that it is desired to store and return at each charge/discharge cycle, maximum power that it is desired to absorb/supply the performance it is desired to achieve in terms of the service life of the battery.

Furthermore, the DC/DC converter 22 regulates the charging power flow of the batteries according to the information provided by a battery management system, BMS "Battery Management System", of a per se known type and is not the subject of the present invention. In fact, in the state of the art, and present on the electric vehicles currently on the market, BMS are provided, connected to the batteries and designed to detect and make available the information relating to the residual charge of said batteries and information relating to the battery recharging systems, in terms of current, voltage and temperature. Furthermore, batteries normally available on the market incorporate said BMS.

As illustrated in FIG. 2, a switch K5 (of a similar type to the switches K1-K4) is interposed between the electronic DC/DC converter 22 and the DC bus 1, to connect/disconnect the electronic converter DC/DC 22, and therefore the battery pack 21, to/from DC bus 1.

Furthermore, optionally, a switch K6 (of a similar type to the switches K1-K5) is inserted on the DC bus 1 so that when the switch K5 is open (i.e., it does not conduct), the portion of the DC bus 1, to which the engine-generator 6, the traction drive 3 and the auxiliary services 5 are connected, is electrically isolated from the rest of the DC bus 1. In this way, as better clarified by the following description, when the battery pack 21 supplies the DC bus 1, the energy supplied by the battery pack 21 is solely used by the traction drive 3 (in particular by the electric motor 3b) and, if required, by the auxiliary services 5, and is not dispersed on the rest of the DC bus 1 (to which other loads could be coupled, which must not be powered by the battery pack 21).

In the specific case in which the DC bus 1 operates at a voltage greater than the voltage at which the battery pack 21 operates, the DC-DC converter 22 is configured to operate as a voltage lowering converter, (for example "buck converter") to supply electricity from the DC bus 1 to the battery pack 21, and as a voltage boost converter to supply electricity from the battery pack 21 to the DC bus 1.

It is evident that, in the event that the DC bus 1 operates at a voltage lower than the voltage at which the battery pack 21 operates, the DC-DC converter 22 operates inversely to that previously specified.

The DC-DC converter 22 operates, furthermore, during the power phases of the electric motor 3b by the battery pack 21, to transfer energy from the battery pack 21 to the electric motor 3b by means of the DC bus 1, as better illustrated in the following.

In general, the DC-DC converter 22 carries out an energy adaptation to transfer energy from the DC bus 1 to the battery pack 21, and to transfer energy from the battery pack 21 to the DC bus 1.

Figure 3:
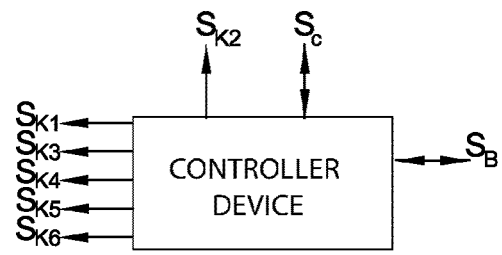
FIG. 3 schematically illustrates a controller device configured to control the system of FIG. 2 in a plurality of operative conditions.

The K1-K6 switches can be controlled in their respective operative conditions (open/closed) by a generic controller device, or microcontroller, 30 (FIG. 3) integrated in specific components of the power supply system 20 or external to the power supply system 20.

If external to the power supply system 20, the microcontroller 30 can be, for example, integrated into the TCMS ("Train Control and Management System") for the control/monitoring/management (not shown in the figures) of the vehicle, and be configured to detect an event that requires powering the electric motor 3b by means of the battery pack 21 or the engine-generator 6. The microcontroller 30 itself is also configured to detect operative conditions in which the battery pack 21 can be recharged according to the indications of the BMS, such as described in more detail in the following.

Alternatively, the functions described with reference to the microcontroller 30 can be performed in distributed form by the control and management systems of the vehicle.

The microcontroller 30 (or, alternatively, the distributed control and management systems) operates, as has been stated, by acquiring information from the TCMS—"Train Control and Management System" (signal $S_C$) in particular about the operating mode to be implemented described in the following, the state power supply of the DC bus by catenary (power supply by catenary present/not present), operative conditions of the engine-generator (number of revolutions of the combustion engine, fuel level, etc.), the operative conditions of the various power converters (AC/DC and DC/DC) and information from the BMS (signal $S_B$) relating to the state of charge of the batteries 21, their maximum suppliable/absorbable power, and their temperature to evaluate when it is possible to recharge or use the battery pack 21.

It should be noted that the signal $S_C$ is bidirectional: the microcontroller 30 receives information from the TCMS and sends information to the TCMS (power supply by catenary present/not present, state of the contactors, operating mode implemented, state of the engine-generator, etc.).

Similarly, the signal $S_B$ is also bidirectional: the microcontroller 30 receives information, but also sends control information to the AC/DC, DC/DC converters, traction drive, braking chopper, auxiliary services converter.

The microcontroller 30 therefore sends suitable control signals $S_{K1}$-$S_{K6}$ of the respective switches K1-K6 to:

connect/disconnect the engine-generator 6 and the converter 7 to/from the DC bus 1 (signal $S_{K1}$ acting on the switch K1);

connect/disconnect the pantograph 2 to/from DC bus 1 (signal $S_{K2}$ acting on switch K2);

connect/disconnect the traction drive 3 to/from the DC bus 1 (signal $S_{K3}$ acting on switch K3);

connect/disconnect the auxiliary services 5 and the auxiliary services converter 4 to/from the DC bus 1 (signal $S_{K4}$ acting on the switch K4);

connect/disconnect the battery pack 21 and the DC/DC converter 22 to/from the DC bus 1 (signal $S_{K5}$ acting on the switch K5); and connect/disconnect the portion of the DC bus 1 to which the engine-generator 6, the traction drive 3, the auxiliary services 5 and the battery pack 21 are coupled to/from the rest of the DC bus 1 (signal $S_{K6}$ acting on switch K6).

With reference to FIGS. 4-15, details of the operation of the power supply system 20 of FIG. 2 are described, in respective operative conditions which are selected by the driver and/or activated by the controller device as an alternative to each other. To each operative condition a name is here assigned, which is useful for immediate reference to each of them.

Reference will also be made in the following to the states illustrated in the diagram of FIG. 19.

Figure 19:
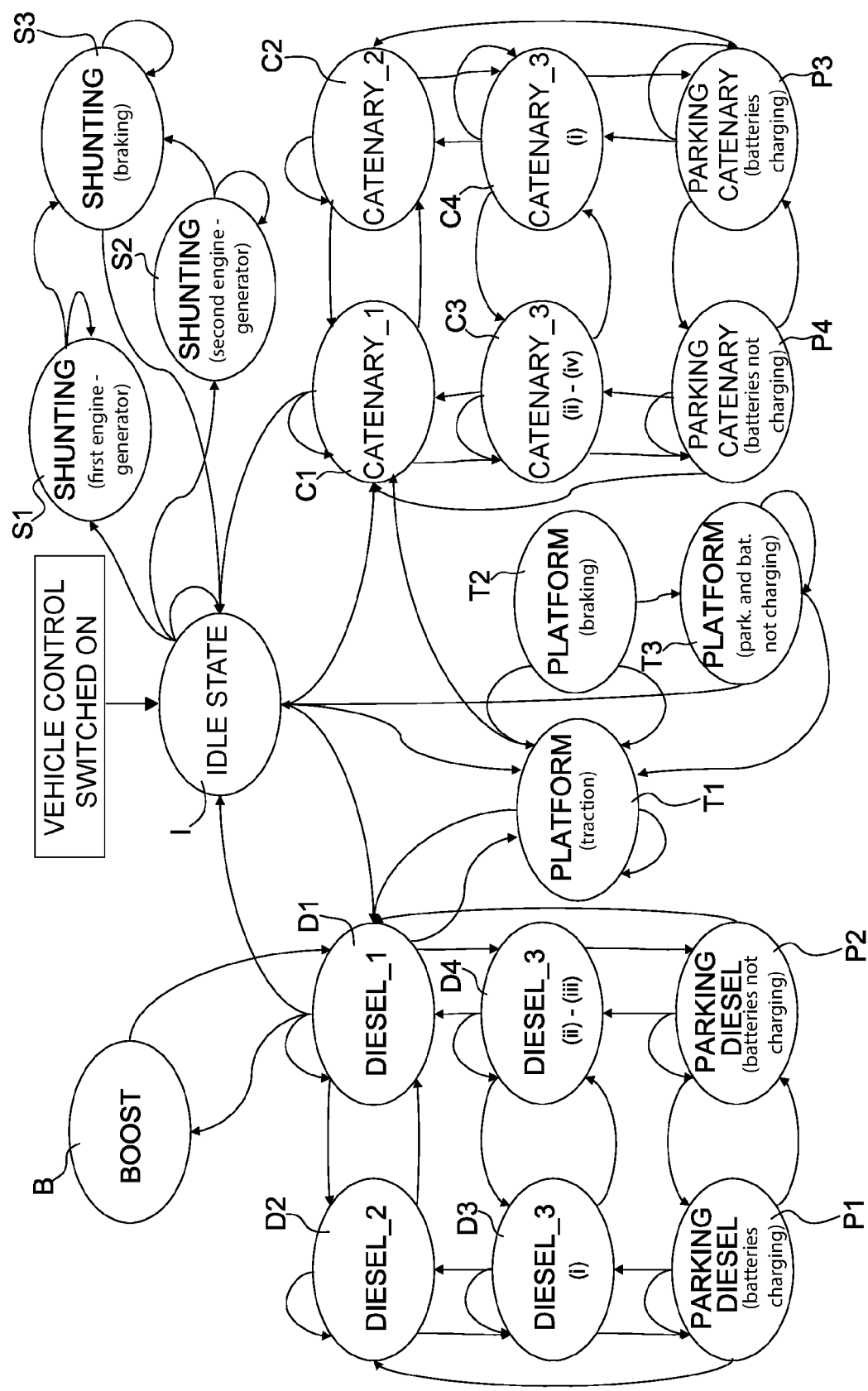
FIG. 19 illustrates a state diagram of the conditions or operating modes of the vehicle with electrical traction, envisaged according to the present invention.

Operative Condition "IDLE" (State I in FIG. 19)

Figure 4:
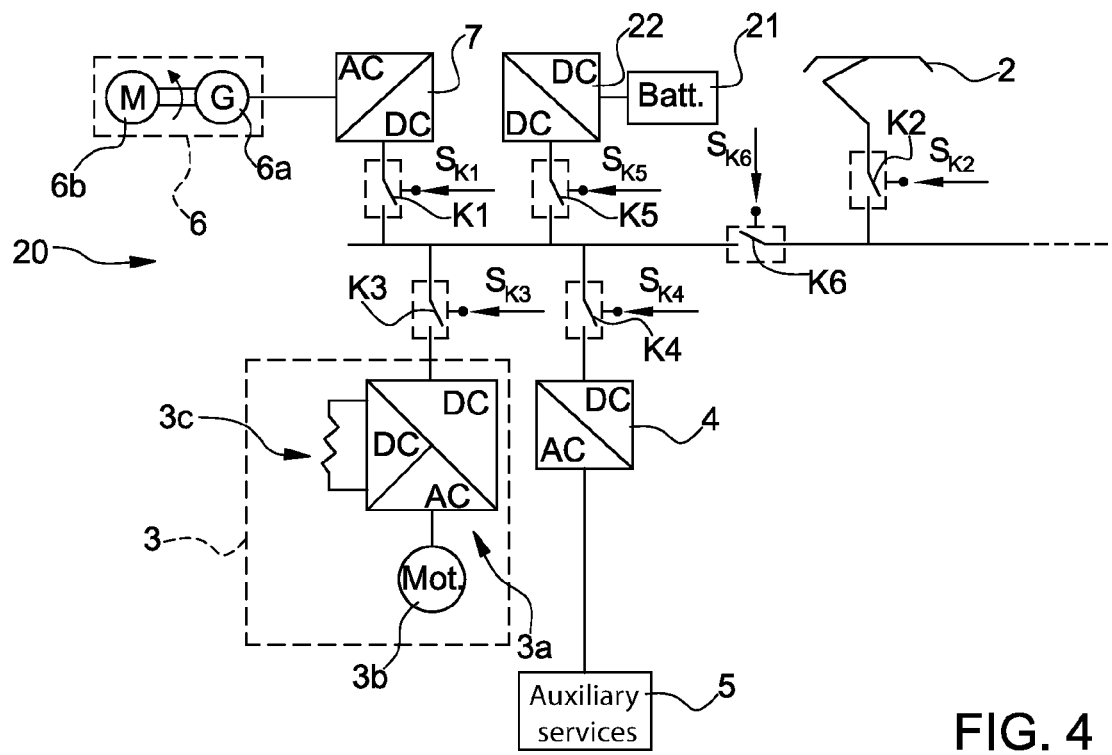
FIGS. 4-15 illustrate respective operative conditions of the system of FIG. 2, according to respective aspects of the present invention.

FIG. 4 illustrates the power supply system 20 in the vehicle off condition, that is, in which the vehicle is not in traction and all the auxiliary systems are not powered. In this case, all the switches K1-K6 are open, the engine-generator 6 is off, the pantograph 2 lowered or in any case disconnected from the catenary 104, and the electric motor 3b is not receiving power.

Operative Condition "CATENARY_1" (State C1 in FIG. 19)

Figure 5:
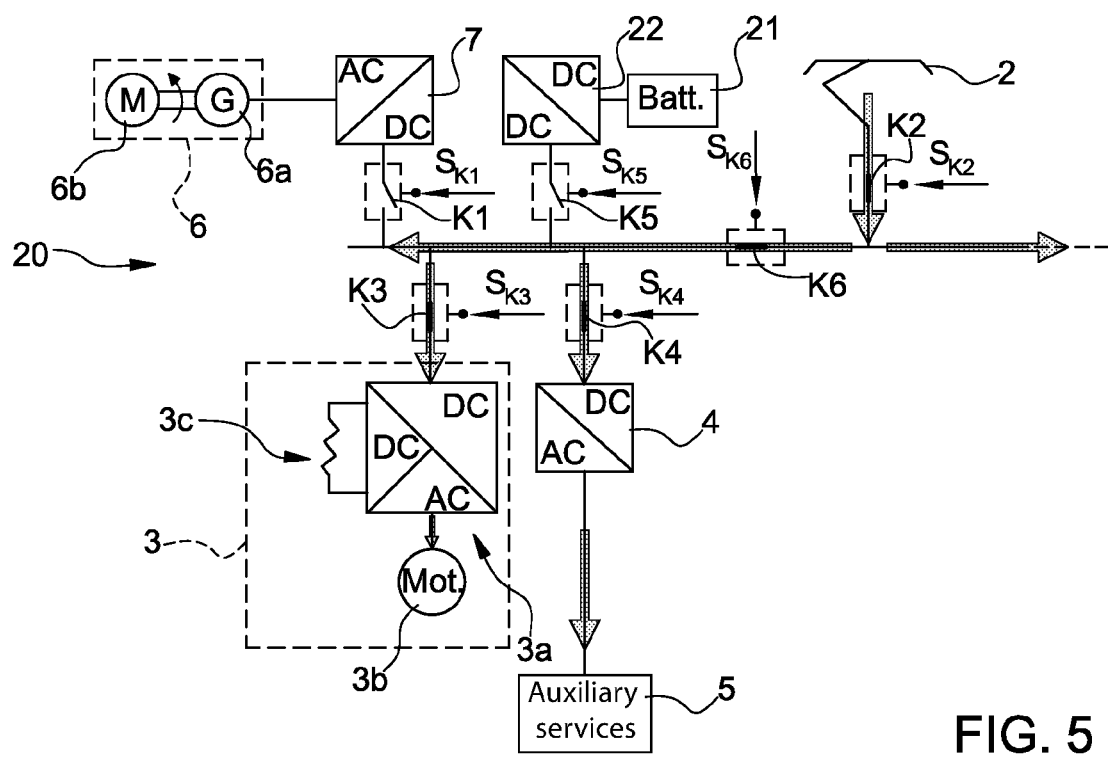

FIG. 5 illustrates the power supply system 20 when the vehicle is powered by means of an external power line (i.e., by catenary 104). In this case, the catenary 104 supplies both the electric motor 3b and the auxiliary systems 5. In this operating mode the engine-generator 6 is off and the batteries 21 do not supply energy for traction. The switches K2, K3, K4 and K6 are closed, while the other switches are open.

Operative Condition "CATENARY_2" (State C2 in FIG. 19)

Figure 6:
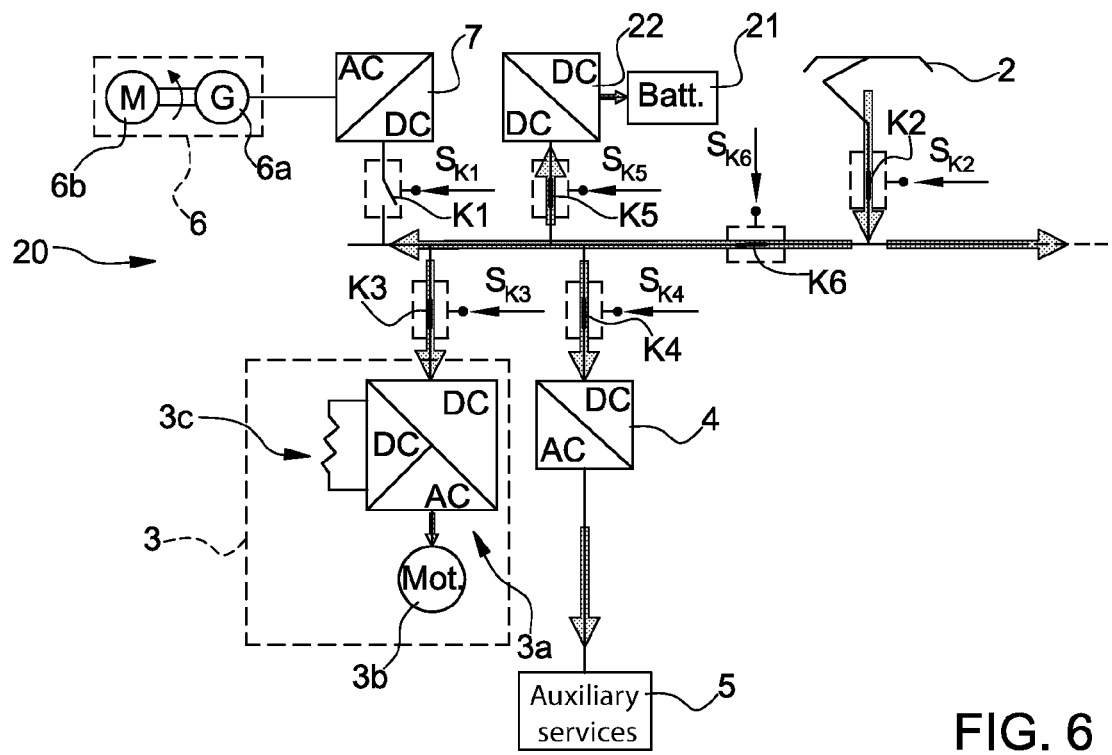
Figure 7:
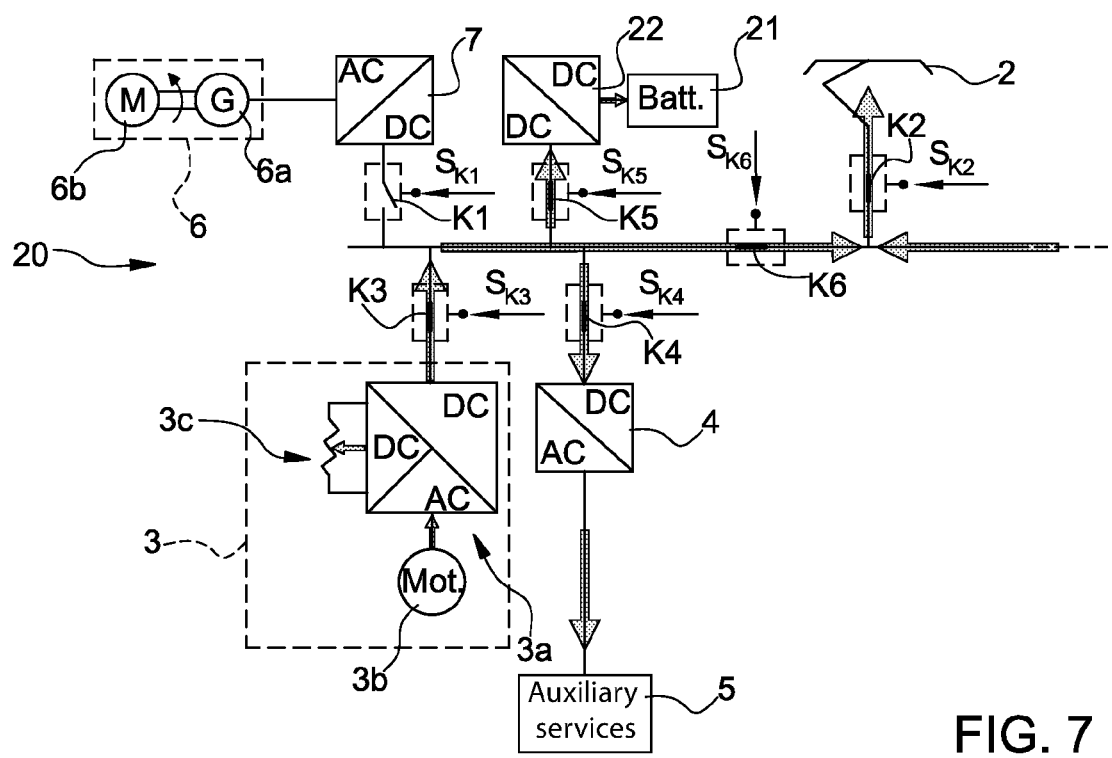

If the state of charge of the batteries 21 is below a threshold value, and the vehicle is powered by means of an external power line (catenary 104), the battery pack 21 can be recharged by drawing energy from the DC bus 1 which, in turn, receives power from the catenary 104, as illustrated in FIG. 6. In this case, in addition to the switches K2, K3, K4 and K6, switch K5 is also closed. The remaining switches are open.

Operative Condition "CATENARY_3" (States C3 and C4 in FIG. 19)

When the vehicle is powered by means of an external power line (catenary 104) and is braking (FIG. 7), the braking energy generated by the electric motor 3b is channeled to one or more of the following:
  i. the battery pack 21, by means of the DC/DC converter 22 if the state of charge of the batteries is such that the batteries 21 must or can be recharged (by closing the switches K3 and K5)—state C4 in FIG. 19;
  ii. the catenary 104, if the state of charge of the battery pack 21 is such that the batteries 21 must not or cannot be recharged (by closing the switches K3, K2 and K6)—state C3 in FIG. 19;
  iii. the auxiliary systems 5, by means of the respective converter 4 (by closing the switches K3 and K4)—state C3 in FIG. 19;
  iv. the braking resistor 3c, which dissipates excess energy (by activating the respective DC/DC converter to which the braking resistor 3c is coupled)—state C3 in FIG. 19.

Therefore, if the state of charge of the batteries 21 is such that it is assumed that the batteries cannot store braking energy, they are excluded from the propulsion circuit during electric braking.

Operative Condition "DIESEL_1" (State D1 in FIG. 19)

Figure 8:
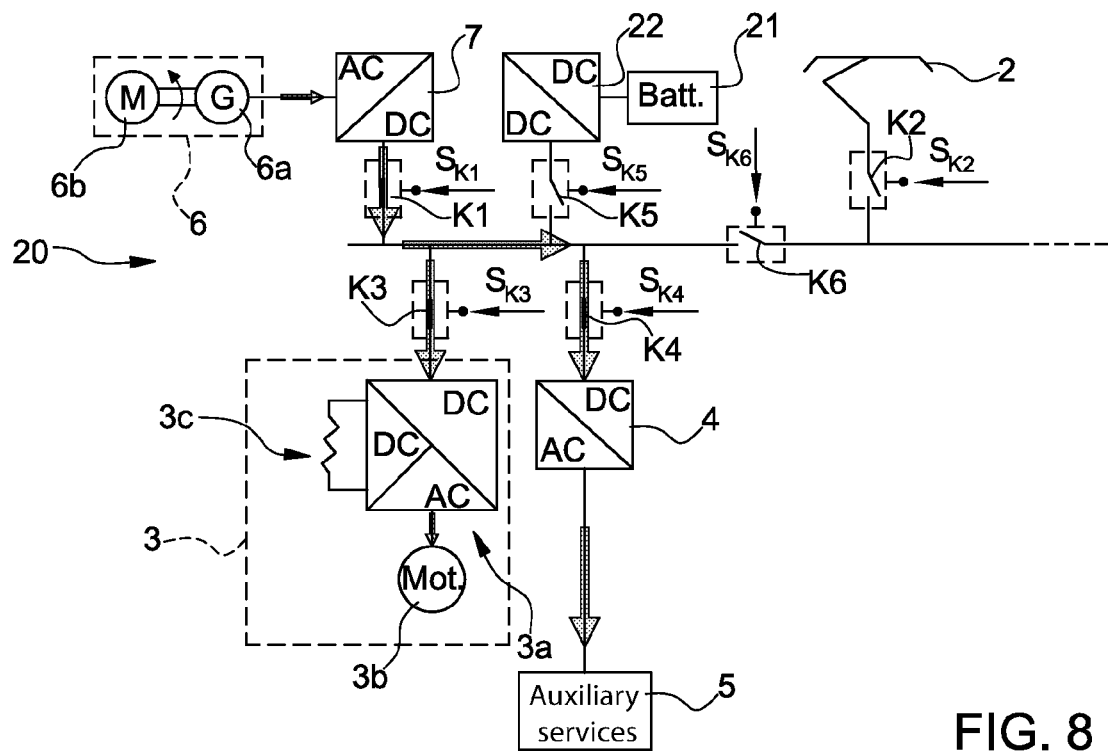

With reference to FIG. 8, in this operative condition the engine-generator 6 powers both the electric motor 3b of the vehicle and the auxiliary systems 5. In this operating mode neither the catenary 104 nor the battery pack 21 provide energy for traction. The switches K1, K3 and K4 are closed and the remaining switches are open.

Operative Condition "DIESEL_2" (State D2 in FIG. 19)

Figure 9:
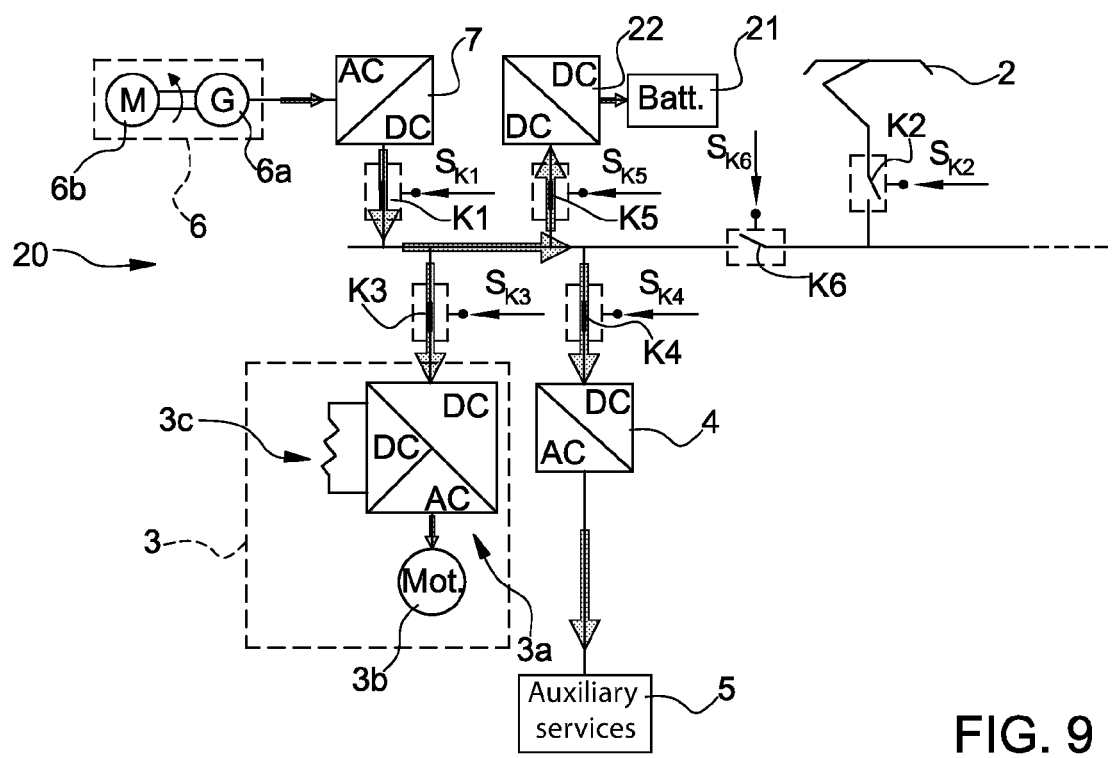
Figure 10:
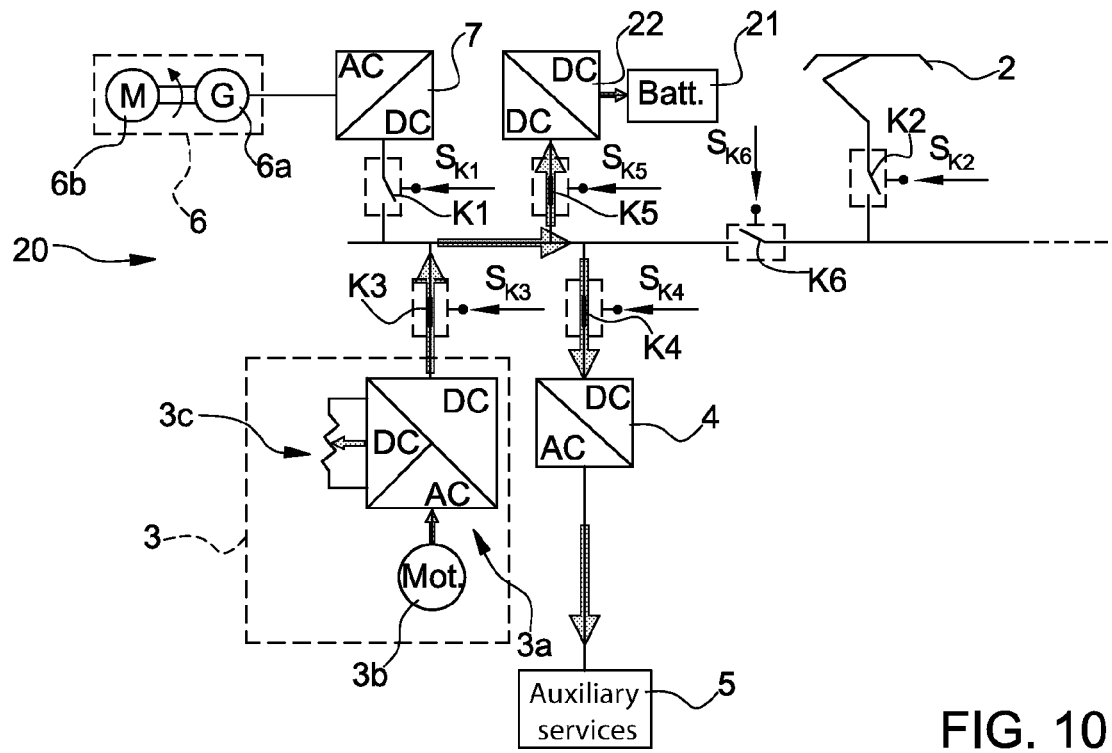

However, if the state of charge of the batteries is below a threshold value (chosen as a trade-off between the need for traction and the ability to recover energy during braking), they can be recharged by the engine-generator 6 even during the operative condition "DIESEL_1", as illustrated in FIG. 9, in which the switch K5 is also closed.

Operative Condition "DIESEL_3" (States D3 and D4 in FIG. 19)

When, on the other hand, the vehicle is braking as a result of the operative condition "DIESEL_1" or "DIESEL_2", the braking energy generated by the electric motor 3b is channeled towards (FIG. 10):
  i. the battery pack 21, by means of the DC/DC converter 22, if the state of charge of the batteries is such that the batteries 21 must or can be recharged (by closing switches K3 and K5)—state D3 in FIG. 19;
  ii. the auxiliary systems 5, by means of the respective converter 4 (by closing the switches K3 and K4)—state D4 in FIG. 19;
  iii. the braking resistor 3c, which dissipates excess energy (by activating the respective DC/DC converter to which the braking resistor 3c is coupled)—state D4 in FIG. 19.

In this operative condition the combustion engine 6a does not shut down. In fact, since there is no request for power, it will decrease its speed, bringing the number of revolutions to a value (not the minimum) such as to be ready for the next power request and reduce consumption to a minimum. If the state of charge of the battery pack 21 is such that it is assumed that the batteries cannot store braking energy, they are excluded from the propulsion circuit during electric braking.

Operative Condition "BOOST" (State B in FIG. 19)

Figure 11:
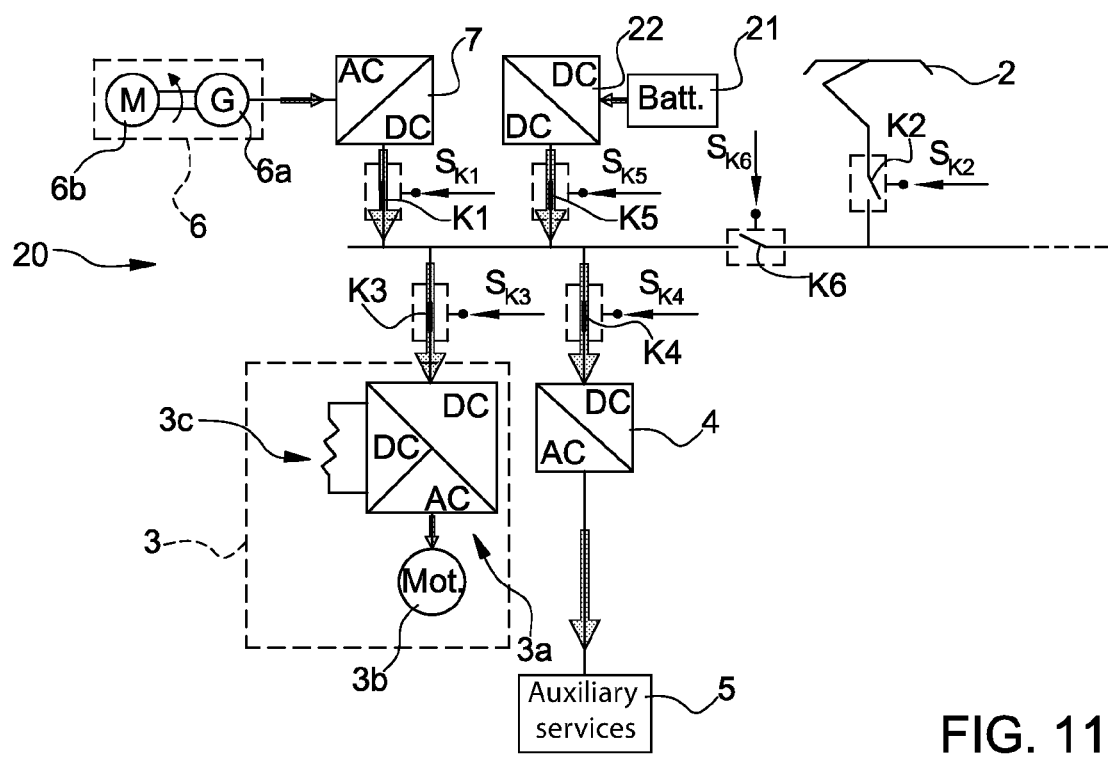

With reference to FIG. 11, the vehicle which is powered by means of the engine-generator 6 (in the operative conditions "DIESEL_1" or "DIESEL_2"), can temporarily increase its traction performance by also using the power supplied by the battery pack 21. In this case, the switches K1, K3, K4 and K5 are closed and the switches K2 and K6 are open. In this condition, therefore, both the engine-generator 6 and the battery pack 21 supply power to the DC bus 1, and the traction drive 3 withdraws this power from the DC bus 1, for the operation of the electric motor 3b. In this operative condition, a "peak shaving" algorithm, of a per se known type, is optionally implemented, thus decoupling the dynamics of the propulsion system (faster) from that of the engine-generator (slower).

Operative Condition "PARKING_DIESEL" (States P1 and P2 in FIG. 19)

Figure 12:
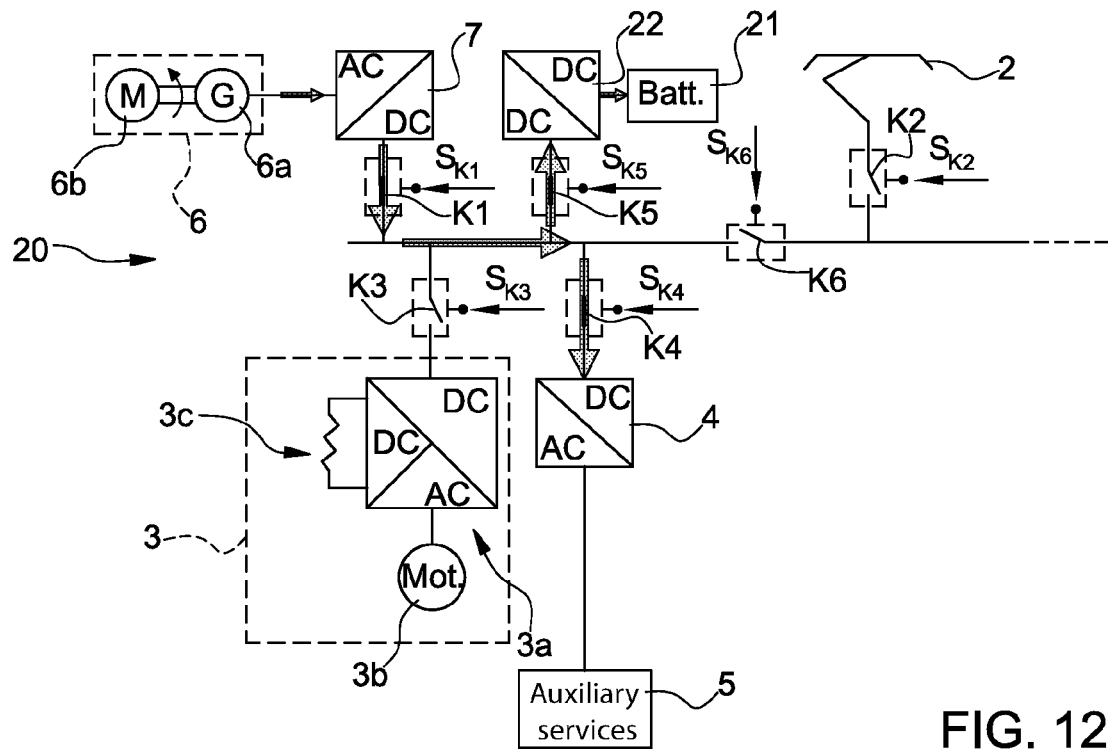

During the stop, where the catenary 104 is not present, the engine-generator 6 only powers the auxiliary systems 5 (and not the traction drive 3), as shown in FIG. 12. The switches K1 and K4 are closed and the remaining switches are open. Optionally (state P1 in FIG. 19) the battery pack 21 can be recharged by closing the switch K5 and activating the converter 22. Otherwise (state P2 in FIG. 19) the battery pack 21 is not recharged.

Operative Condition "PARKING_CATENARY" (States P3 and P4 in FIG. 19)

Figure 13:
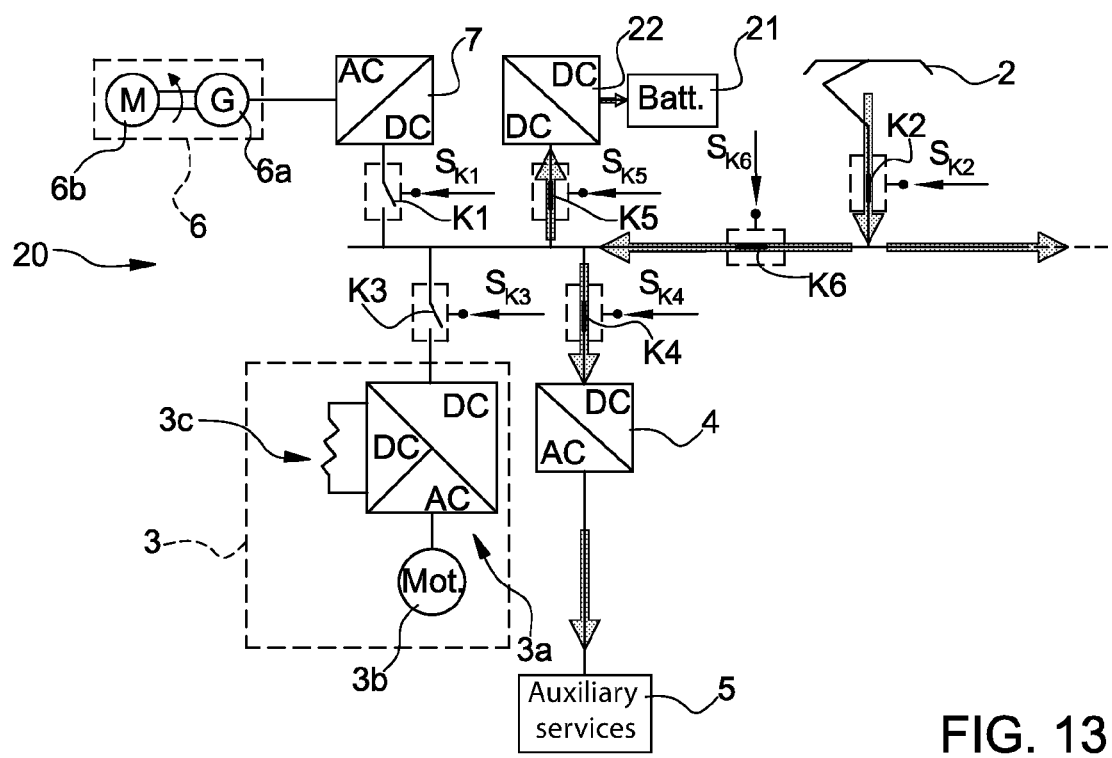

During the stop, where the catenary 104 is present, the engine-generator 6 is off and the catenary 104 powers the auxiliary systems 5 (and not the traction drive 3), as shown in FIG. 13. The switches K2, K4 and K6 are closed and the remaining switches open. Optionally (state P3 in FIG. 19)

the battery pack 21 can be recharged by closing the switch K5 and activating the converter 22. Otherwise (state P4 in FIG. 19) the battery pack 21 is not recharged.

Operative Condition "PLATFORM_TRACTION" (State T1 in FIG. 19)

Figure 14:
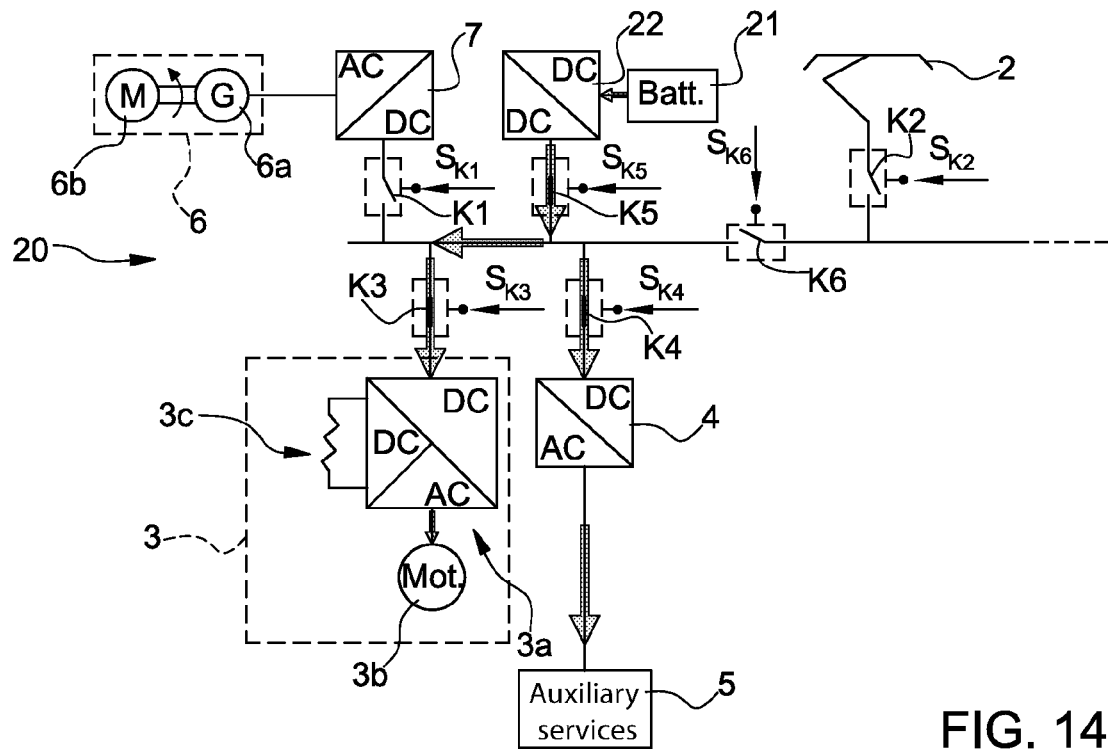

The vehicle, for a short distance and until it stops at the station, when departing from a station, or to be moved and placed in safety conditions, is able to proceed using only the battery pack 21 to propel the electric motor 3b and, if necessary, the power supply of the auxiliary systems 5. In this way, no $CO_2$ is emitted and the noise of the vehicle in the station and in its vicinity is reduced. This condition is illustrated in FIG. 14, in which the switches K3, K4 and K5 are closed, so that the battery pack 21 can feed the power drawn from the traction drive 3 and from the auxiliary services 5 onto the DC bus 1.

The transition from one power supply mode to another (from the engine-generator 6 to the battery pack 21, and vice versa), is managed so as to minimize or eliminate the loss of traction performance.

By way of example, when the vehicle is approaching a station, this operative condition may be set by the driver, and as a result of this setting, the controller device actually activates the power supply from the battery pack 21, decoupling and switching off the engine-generator 6, if (at least) the following conditions are met:

the vehicle is travelling below a certain threshold speed (e.g. 30 km/h) and the state of charge of the battery is sufficient to provide electrical energy for the distance remaining from the stop station;

if so, the controller device configures the switches so as to switch to the new operation mode. Preferably, this transition is performed according to the transition procedure described below.

As far as the reverse transition is concerned, from battery to engine-generator, preferably, before leaving a station, the controller device checks whether the state of charge of the batteries allows for covering the distance that is required in order to move away by a pre-set distance and/or to reach such threshold speed: if positive, it configures the switches to maintain the battery power mode, otherwise it switches to the power mode by engine-generator 6, even if the vehicle is still at the station, if it is possible to charge the batteries at the station, and if it is possible to delay the departure, it waits for the batteries to be recharged.

In general, the controller device manages the charging of the batteries while the vehicle is running in such a way that the state of charge is already at a level sufficient to travel, by battery power, both the approach and the departure from the station, without having to recharge the batteries at such station.

Preferably, when a threshold forward speed is reached, the controller device starts the combustion engine 6a of the engine-generator 6, which is afterwards electrically coupled to the DC bus 1 by closing the switch K1 so as to perform the transition procedure described in detail below.

Operative Condition "PLATFORM_BRAKING" (State T2 in FIG. 19)

Figure 15:
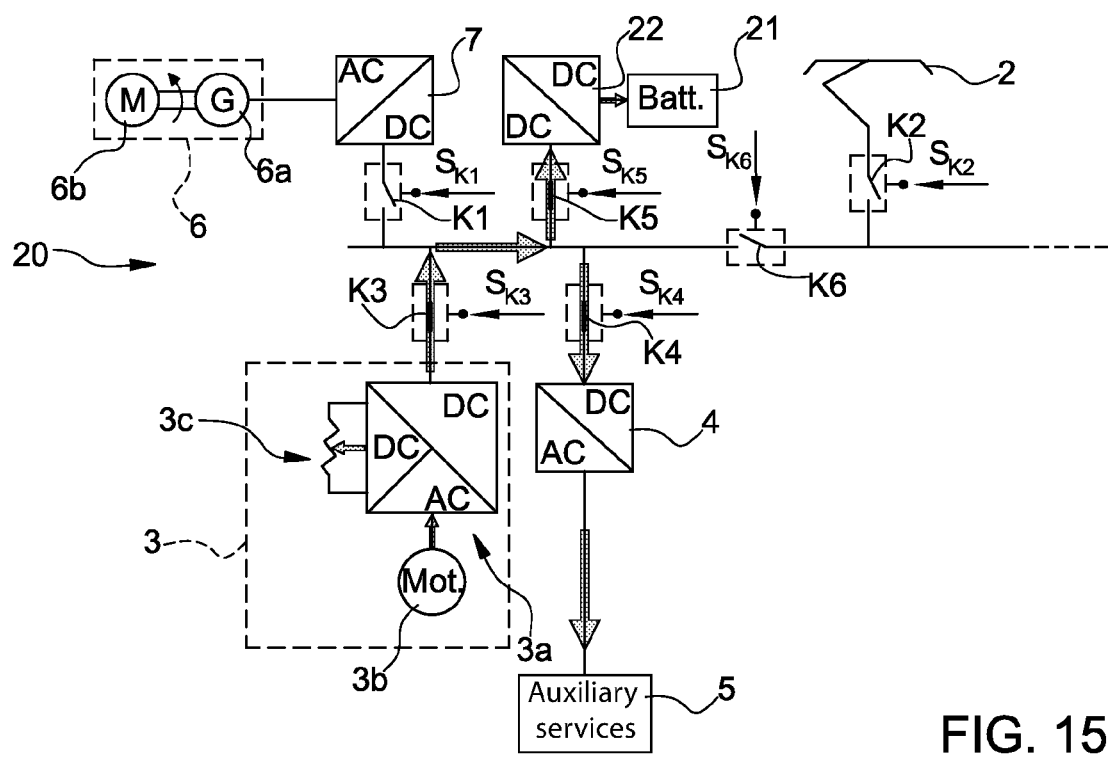

With reference to FIG. 15, when the vehicle passes from the previous operative condition "PLATFORM_TRACTION" (state T1) to a braking phase (state T2), the braking energy generated by the electric motor 3b is channeled towards:

i. the battery pack 21, by means of the DC/DC converter 22, if the state of charge of the batteries is such that the batteries 21 must or can be recharged (by closing switches K3 and K5);

ii. the auxiliary systems 5, by means of the respective converter 4 (by closing switches K3 and K4);

iii. the braking resistor 3c, which dissipates excess energy (by activating the respective DC/DC converter to which the braking resistor 3c is coupled).

Operative Condition "PLATFORM_PARKING" (State T3 in FIG. 19)

A further operative condition provides that the vehicle is halted, for example in a station, and that the auxiliary services 5 must be powered. In this case, in the possible absence of catenary 104 or other external power supply means, the energy needed in order to power the auxiliary services 5 is drawn from the battery pack 21. For this purpose, switches K4 and K5 are closed.

The following table summarizes the state of the K1-K6 switches in the aforementioned operative conditions (the state "0" indicates open switch, or not conducting switch; the state "1" indicates the closed switch, or conducting switch).

| OPERATIVE CONDITION | K1 | K2 | K3 | K4 | K5 | K6 |
|---|---|---|---|---|---|---|
| IDLE | 0 | 0 | 0 | 0 | 0 | 0 |
| CATENARY_1 | 0 | 1 | 1 | 1 | 0 | 1 |
| CATENARY_2 | 0 | 1 | 1 | 1 | 1 | 1 |
| CATENARY_3 | 0 | 1 | 1 | 1 | 1 | 1 |
| DIESEL_1 | 1 | 0 | 1 | 1 | 0 | 0 |
| DIESEL_2 | 1 | 0 | 1 | 1 | 1 | 0 |
| DIESEL_3 | 0 | 0 | 1 | 1 | 1 | 0 |
| BOOST | 1 | 0 | 1 | 1 | 1 | 0 |
| PARKING_DIESEL | 1 | 0 | 0 | 1 | 1 | 0 |
| PARKING_CATENARY | 0 | 1 | 0 | 1 | 0 | 1 |
| PLATFORM_TRACTION | 0 | 0 | 1 | 1 | 1 | 0 |
| PLATFORM_BRAKING | 0 | 0 | 1 | 1 | 1 | 0 |
| PLATFORM_PARKING | 0 | 0 | 0 | 1 | 1 | 0 |

According to a further embodiment of the present invention, the vehicle in which the power supply system 20 is implemented, typically a railway vehicle, is provided with two power cars, each with a respective traction drive, a respective engine-generator, respective auxiliary loads and a respective battery pack.

Figure 16:
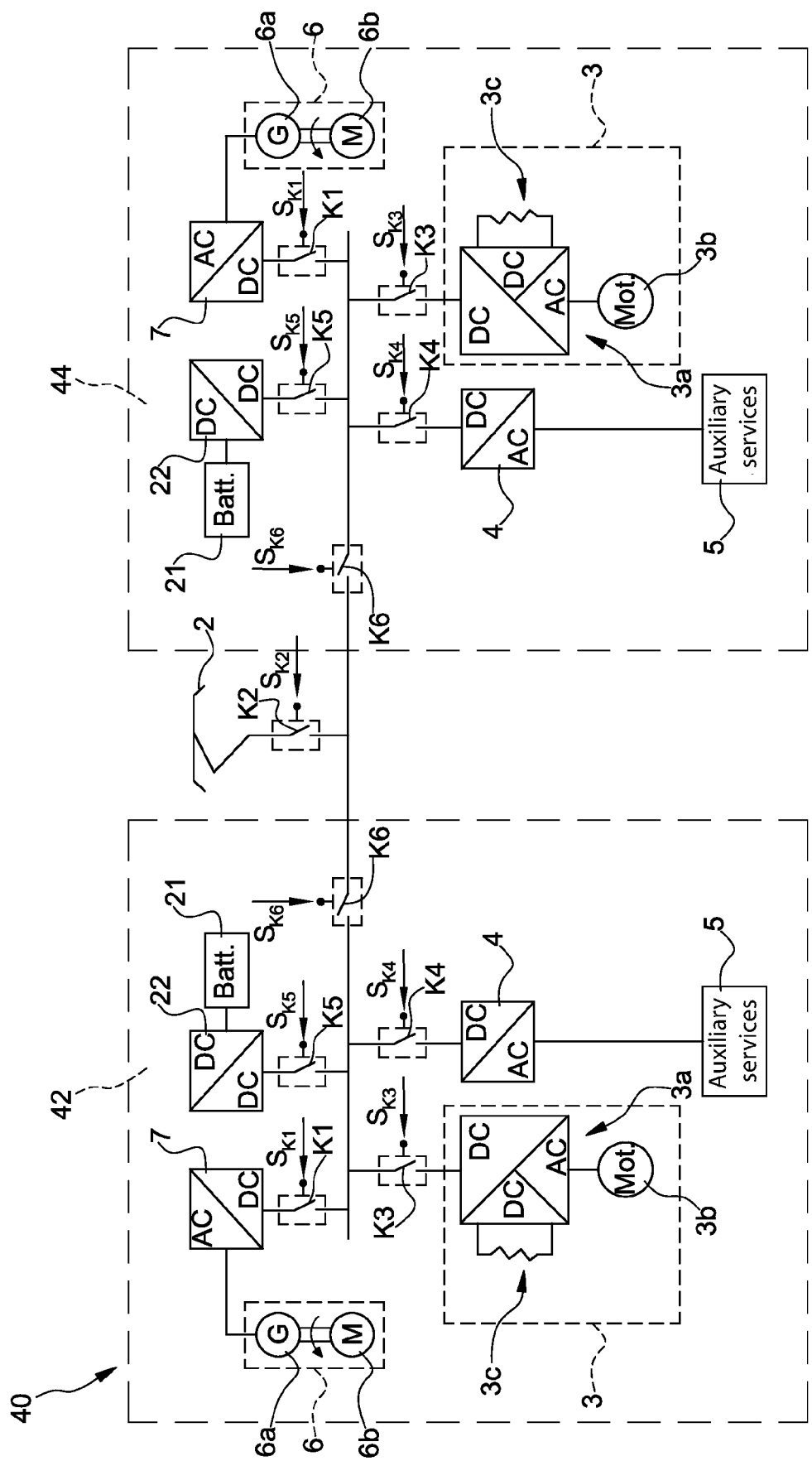
FIG. 16 illustrates an energy management system for a vehicle with electrical traction according to a further embodiment of the present invention.

FIG. 16 illustrates a power supply system 40 of the type mentioned here, i.e., wherein the DC bus 1 is shared between a first power car 42 and a second power car 44. The first and second power cars 42, 44 also share the same pantograph 2, which can be coupled to the catenary 104.

The first power car 42 includes the elements previously described for the power supply system 20 (with the exception, as mentioned, of the pantograph 2 and of the switch K2, which are shared). The second power car 44 is similar to the first power car, as graphically illustrated in FIG. 16, and therefore is not further described herein.

The loads or auxiliary services 5 can be auxiliary services of the first and second power cars 42, 44 respectively, and/or auxiliary services external to the first and second power cars 42, 44 (for example air conditioning, lights, etc. of the entire vehicle).

During the shunting activities at the railway station and/or in the depot, the vehicle comprising the power supply system 40 moves at a very limited speed and powers the auxiliary loads 5 of both engines 42, 44 by using a single engine-generator 6 as a propulsion system, as the required traction power is very low. It is chosen to use, between the two engine-generators 6 that are present, the engine-generator 6 which has a lower number of hours of use (e.g., total hours from the beginning of its life) compared to the other engine-generator 6 (FIG. 17 and, alternatively, FIG. 18).

Figure 17:
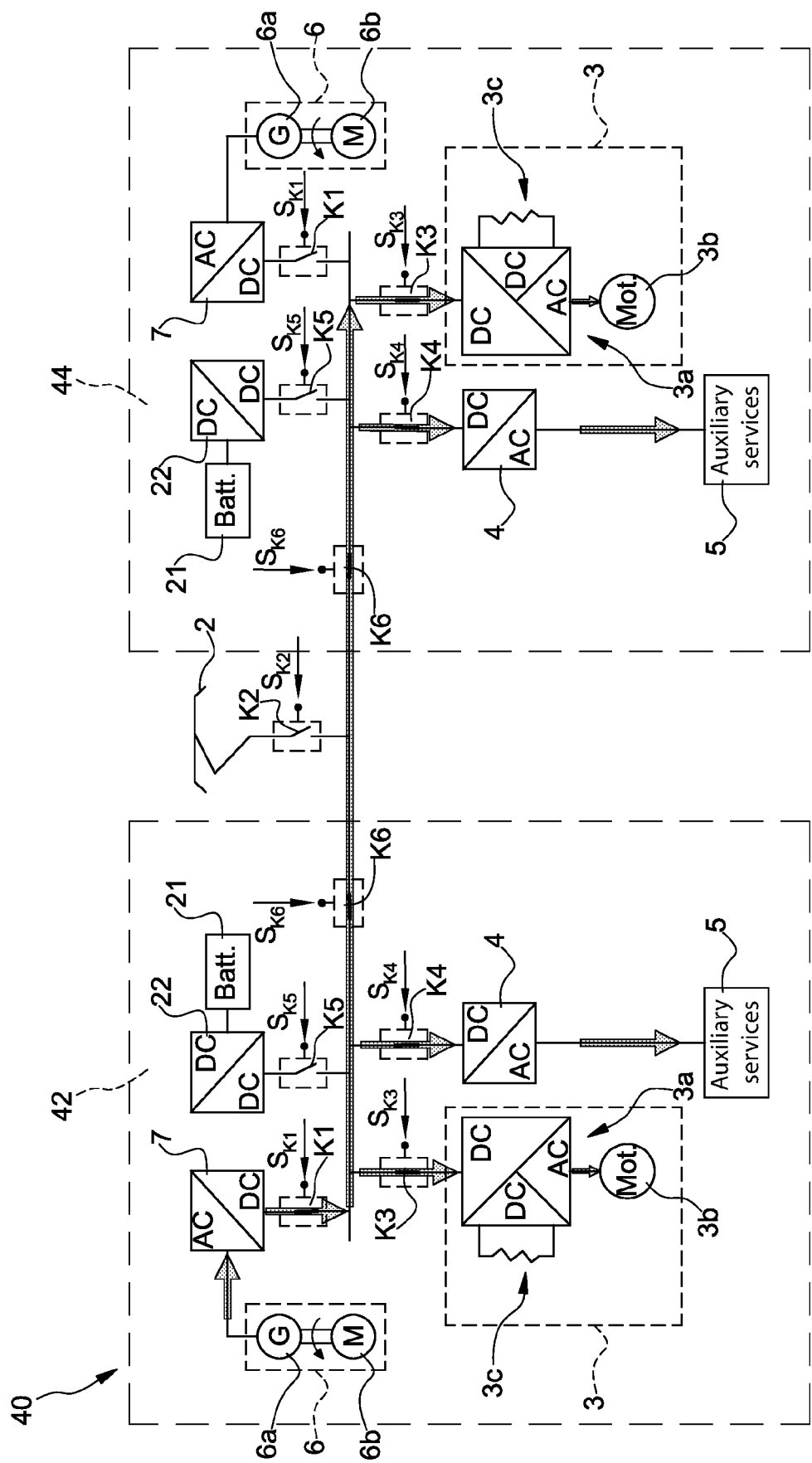
FIGS. 17 and 18 illustrate respective operative conditions of the system of FIG. 16, according to respective aspects of the present invention.

As can be seen from FIG. 17, if the engine-generator 6 of the first power car 42 is used (state S1 of FIG. 19), the power supplied by this engine-generator 6 is fed into the DC bus 1 and used to power both the electric motor 3b and the auxiliary loads 5 of the first power car 42, both the electric motor 3b and the auxiliary loads 5 of the second power car 44. The engine-generator 6 of the second power car 44 is disconnected from the DC bus 1, as well as both battery packs 21.

Figure 18:
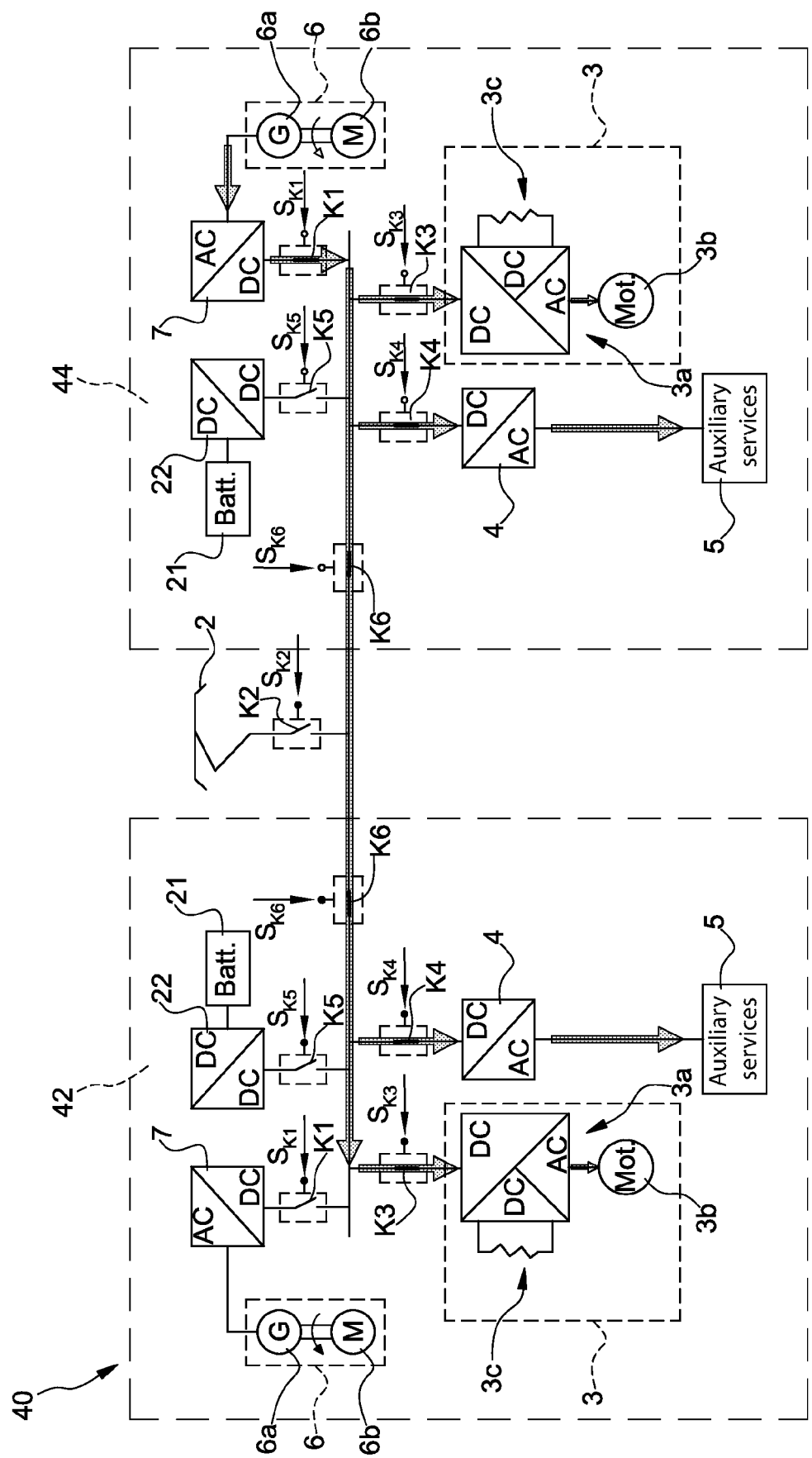

As can be seen from FIG. 18, if the engine-generator 6 of the second power car 44 is used (state S2 of FIG. 19), the power supplied by this engine-generator 6 is fed into the DC bus 1 and used to power both the electric motor 3b and the auxiliary loads 5 of the second power car 44, both the electric motor 3b and the auxiliary loads 5 of the first power car 42. The engine-generator 6 of the first power car 42 is disconnected from the DC bus 1, as well as both battery packs 21.

Furthermore, both in the operative condition of FIG. 17 and FIG. 18, it is possible to recharge one or both of the battery packs 21 by connecting the same to the DC bus 1 by means of the respective switch and converter. This can occur, for example, during a braking phase, in which the respective electric motor operates as an electrical generator (state S3 in FIG. 19). According to an aspect of the present invention, the transition from one operating mode to another is controlled by the control/monitoring system of the entire vehicle (e.g., in the case of a railway vehicle, the TCMS—"Train Control and Monitoring System"), or by a traction control unit (TCU—"Traction Control Unit"), which controls the single traction and energy storage chain. An on-board control system of this type typically includes a processing system provided with at least one controller or microcontroller (e.g., the microcontroller 30).

The on-board control system is configured to enable the following operating modes (what is described here applies both to the system 20 of FIG. 2 and to the system 40 of FIG. 16).

Power Mode Selection

The selection of the operating or power mode is controlled by the driver who, knowing the characteristics of the section and evaluating the operative conditions of the vehicle, decides which operating mode to implement.

Power Control Management (in Traction Mode Via Catenary)

A power management algorithm, based on target acceleration (requested by the driver via the traction lever) and resistive torque, consequently controls the inverter 3a (by using control algorithms known in the literature) and evaluates the necessary traction power to reach the target acceleration.

The electrical power required for traction is, in this context, provided by the catenary 104. The catenary 104 also supplies the power required by the auxiliary systems 5 and the possible charging power of the battery pack, according to the indications of the BMS. The power management algorithm controls the auxiliary services converter by regulating the required power absorption with control algorithms known in the literature, and the DC/DC converter, by using control algorithms known in the literature, to charge the batteries with the defined power. The diesel engine-generator is off.

Power Control Management (in Parking Mode with Catenary)

The vehicle is halted so the traction control is turned off. Once the power required by the auxiliary systems 5 has been defined and the possible charging power of the battery pack has been added according to the indications of the BMS, the electrical power required is supplied by the catenary 104.

In this case, a power management algorithm controls the converter 4 of the auxiliary services 5, thus regulating the absorption of the required power by means of control algorithms known in the literature, and controls the DC/DC converter 22, by using control algorithms known in literature, to charge the batteries 21. The engine-generator 6 is off.

Power Control Management (in Traction Mode Via Engine-Generator)

A power management algorithm, based on target acceleration (requested by the driver via the traction lever) and resistive torque, consequently controls the inverter 3a (by using control algorithms known in the literature) and evaluates the necessary traction power to reach the target acceleration.

The electrical power required for traction is, in this context, provided by the engine-generator 6. In addition, the engine-generator 6 provides the power required by the auxiliary systems 5 and any charging power of the battery pack 21 according to the indications of the BMS. In this context, the power management algorithm regulates the number of revolutions of the combustion engine 6a and controls the AC/DC converter 7 so as to feed the required electrical power on the DC bus 1. The power management algorithm also controls the auxiliary services converter 4 and the DC/DC converter 22, by using control algorithms known in the literature.

Power Control Management (in Parking Mode with Engine-Generator)

In this condition, the vehicle is halted and therefore the traction control is switched off. Once the power required by the auxiliary systems 5 has been defined and the possible charging power of the battery pack 21 has been added according to the indications of the BMS, the power management algorithm regulates the number of revolutions of the combustion engine 6a and controls the AC/DC 7 so as to feed the required electrical power on the DC bus 1. The power management algorithm also controls the auxiliary services converter 4 and the DC/DC converter 22, by using control algorithms known in the literature.

Power Control Management (in "Shunting" Mode)

A power management algorithm, based on target acceleration (requested by the driver via the traction lever) and resistive torque, consequently controls the inverter 3a (by using control algorithms known in the literature) and evaluates the traction power required to reach the target acceleration.

The power management algorithm determines, furthermore, which engine-generator 6, among the two available on-board, is to be used (as mentioned, depending on the lower number of operating hours) and regulates the number of revolutions. The activated engine-generator 6 also generates the power required by the auxiliary systems 5 and any charging power of the battery pack 21 according to the indications of the BMS. The power management algorithm also controls, in this context, the AC/DC converter 7 so as to feed the required electrical power on the DC bus 1. The power management algorithm also controls the auxiliary services converter 4 and the DC/DC converter 22, by using control algorithms known in the literature.

Power Control Management (in "Vehicle in Platform" Mode)

A power management algorithm, based on target acceleration and resistive torque, consequently controls the inverter 3a by using control algorithms known in the literature and evaluates the traction power required to ensure said acceleration. The power required by the auxiliary systems 5 is also defined. The algorithm, in this context, keeps the engine-generator 6 off and forces the DC/DC converter 22 coupled to the battery pack 21 to deliver the total power required by the drive 3 and the auxiliary services 5. The algorithm controls the auxiliary services converter 4 by regulating the absorption of the required power with control algorithms known in the literature, and the DC/DC converter 22, by using control algorithms known in the literature, so that the batteries deliver the power required by the drive 3 and by the auxiliary services 5.

In this mode, the propulsion system switches from power supplied only by battery to power supplied only by the engine-generator, and vice versa. For this reason, the power management algorithm is also responsible for the transition between the two different power supplies, according to following points "a." and "b.".

a. From battery power to power by combustion engine: the battery pack 21 via the DC/DC converter 22 is delivering power to the DC bus 1. When the transition procedure is started, the combustion engine 6a of the engine-generator 6 is started by using the generator 6b as a starter electric motor, supplied by the converter 22 through the DC bus 1 and the converter 7 (the latter being bidirectional). After having started the engine 6a, the voltage of the DC bus 1 is still established by the converter 22.

Preferably, the combustion engine 6a is accelerated to a predefined operating limit speed (e.g., 1200 rpm) while remaining disconnected from the DC bus 1.

Once this limit speed is reached, the engine-generator 6 is coupled to the DC bus 1 by closing the switch K1. In particular, along with the closing of switch K1, the electrical power coming from battery pack 21 is decreased so as to maintain the same power balance (i.e. so as to continue to meet the same power demand, caused by traction drive 3 and any auxiliary services 5). After this phase, in which power supply from the engine-generator is activated, the power management algorithm gradually increases the power delivered by the engine-generator 6 (by increasing the rotational speed of the combustion engine, for instance) and keep on reducing the power supplied by the battery pack 21 so as to maintain the power balance with the drive 3 and the auxiliary services 5. When the engine-generator 6 is able to supply the entire required power, then the battery pack 21 is disconnected from the traction chain (by opening the switch K5).

b. From power by combustion engine to battery power: the engine-generator 6 via the AC/DC converter 7 is delivering power to the DC bus 1. When the transition procedure is started, the combustion engine 6a is decelerated until the above-mentioned limit speed. The power management algorithm gradually decreases the power delivered by the engine-generator 6 and increases that supplied by the battery pack 21 while maintaining the power balance with the drive 3 and the auxiliary services 5. When the battery pack 21 is able to supply the entire traction power, then the engine-generator 6, having reached the limit speed, can be shut-off and is disconnected from the traction chain (by opening the switch K1).

Regarding the shut-off of the combustion engine 6a, its speed is further reduced from the limit speed (e.g., 1200 rpm) to a minimum speed (e.g., 600 rpm). Due to the lowering of electrical energy supplied by the engine-generator 6 to the DC bus 1, the voltage of the DC bus 1 is essentially set by the converter 7. Once the minimum speed is reached, the combustion engine 6a is shut-off, and the switch K1 is also opened.

Upon complete shutdown of vehicle 1, converter 3c ("braking chopper") is used to discharge electrical energy and reduce the voltage of the DC bus 1 to zero.

Power Control Management (in "Boost" Mode)

A power management algorithm, based on target acceleration (requested by the driver via the traction lever) and resistive torque, consequently controls the inverter 3a (by using control algorithms known in the literature) and evaluates the traction power required to reach the target acceleration. The power required by the auxiliary systems 5 is also defined. The power management algorithm regulates the number of revolutions of the combustion engine 6a and controls the AC/DC converter 7 so as to feed the required electric power to the DC bus 1. The difference between the power required by the drive 3 and by the auxiliary services 5 and that produced by the engine-generator 6 is provided by the battery pack 21.

In other words, the engine-generator 6 is controlled so as to deliver the maximum possible power, or the maximum deliverable power in times compatible with those required, and the battery pack 21 provides a further aliquot of power which is added to that of the engine-generator 6.

The electrical power which the batteries 21 must deliver is thus defined.

The previously described operating modes, as well as the transition from one mode to the other, are evident from the state diagram in FIG. 19.

In particular, with reference to said FIG. 19, it should be noted that, when switched on, the vehicle from a waiting condition, or "idle" (state I) can be placed in one of the traction configurations between: traction by engine-generator 6 (state D1, in the left portion of the state diagram), platform (state T1), traction by means of catenary (state C1 in the right portion of the state diagram) and shunting (states S1 or S2).

In each of the traction configurations (states D1 or C1), the vehicle can remain there, charging or not charging the batteries (states D2 and C2, respectively), or pass through the corresponding braking state (states D3-D4, or C3-C4, respectively). From these states, the vehicle can go to the respective parking states, both with power supply from catenary (states P3-P4) and with power supply from engine-generator (states P1-P2).

From traction with engine-generator (state D1), in the event of greater power demand, the vehicle switches to boost mode (state B), and from this it returns to simple traction with engine-generator (state D1).

Furthermore, from the traction with engine-generator (state D1), or from the idle state (state I), the vehicle switches into the traction state T1 approaching a station and, from here, into the braking states T2 and T3 in station and parking in the station.

From the idle state (state I), the vehicle switches into one of the two traction shunting states (state S1 or S2), and from there into braking (state_S3).

Figure 20:
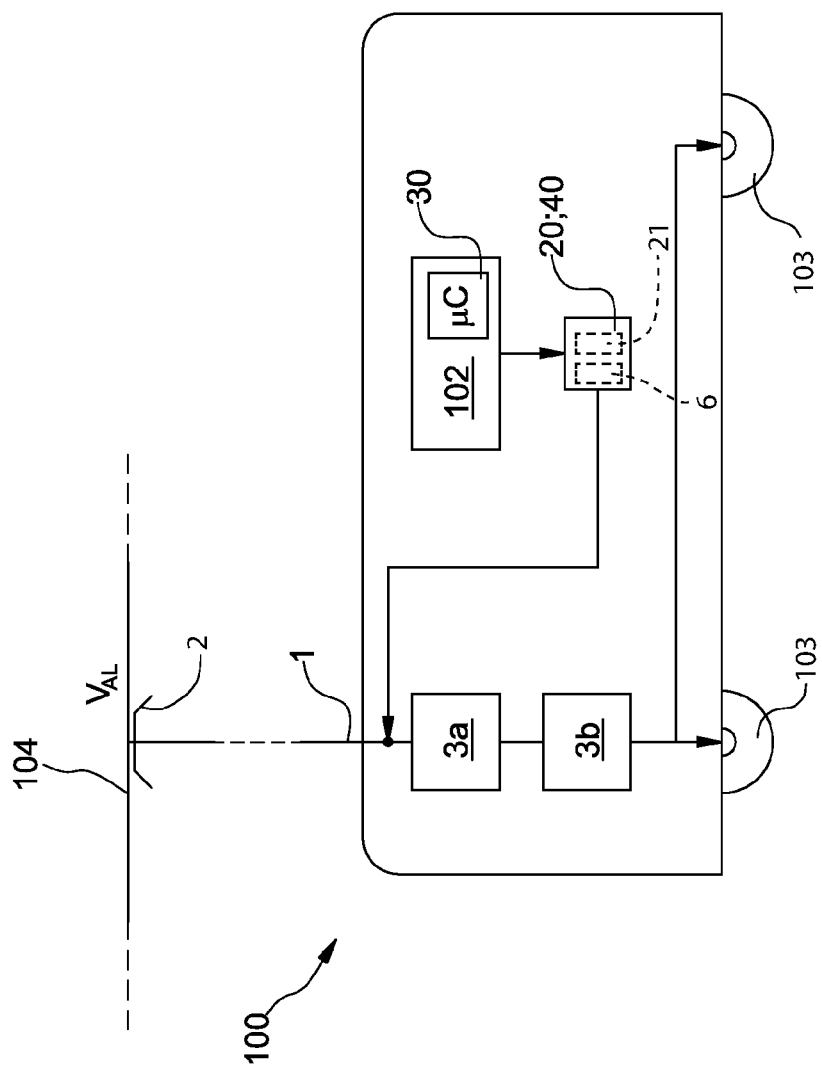
FIG. 20 shows, in schematic form, a vehicle with electrical traction including the auxiliary power supply and energy recovery circuit of FIG. 2 or FIG. 16.

FIG. 20 shows, in schematic form, an electric vehicle 100 including:
- a control system 102, including the microcontroller 30, configured to implement the operating and power management modes previously described; and
- the power supply system 20 of FIG. 2, or the power supply system 40 of FIG. 16, according to the respective embodiments previously described, including the electric motor 3b, electrically coupled to a main power supply line (DC bus) 1 by means of the traction inverter 3a, and operatively and mechanically coupled to one or more wheels 103, to control travel of the vehicle 100 in acceleration, rolling at constant speed and braking thereof.

As it is evident from FIG. 2, the combustion engine 6a of the engine-generator 6, being part of the power supply system 20 and 40, is mechanically disconnected from the wheels 103, as well as being mechanically disconnected and independent from the electric traction motors 3b, under all operating conditions. In other words, the wheels 103 are driven exclusively by the electric traction motors 3b, which in turn are powered exclusively by electricity, without any possible integration of mechanical power; therefore, the vehicle 100 is a purely electrically driven vehicle, even though it is equipped with the combustion engine 6a.

The electric vehicle 100 is selected from the group comprising: a railway vehicle, a tram, a streetcar, or other electric vehicle, powered by means of a generic external power supply network (e.g., catenary 104), designed to supply a network supply voltage VAL.

From an examination of the characteristics of what is described and illustrated herein, the advantages that the invention according to the present invention allows to be obtained are evident. In particular, the present invention allows to
  (i) increase energy efficiency by recovering the kinetic energy on-board of the vehicle during the braking phase, by transforming it into electrical energy stored in the batteries and re-using it when appropriate or necessary; this allows the containment of energy consumption, with advantageous economic returns for the railway operator in terms of costs and eco-sustainability;
  (ii) contain the power peaks and the effective current on the main power line, or increase the peak performance of the rolling stock at the same peak power of the main power line; this makes it possible to increase the performance of the convoy of railway vehicles (increase the number of vehicles on the line or their performance in terms of acceleration) without investing in the infrastructure, and specifically without the need to upgrade or increase the number of power supply substations;
  (iii) allow the electric vehicle to run on long routes without an external power supply. This makes the vehicle more versatile, allowing the same to be used on routes that include urban environments of historical and architectural value that are not compatible with the presence of the main power line; the maintenance depots or workshops where there is no main power line; sections of the main power supply line not powered for maintenance work on the infrastructure; emergency running, for example in the event of a power failure on the main power supply line, to take the vehicle out of a tunnel to the station and evacuate passengers from the same in complete safety; frozen subsections of the main power line.

The battery pack is sized to store the high energy required to move the vehicle in the absence of power on the main power line. Since said run is performed at reduced speed, the required discharge powers are limited. On the other hand, charging can also be carried out in relatively slow times, taking advantage of all the "cruising" phases (running at constant speed) and parking of the electric vehicle, which take place, for example, between two battery-powered running phases.

In addition to reducing consumption as it allows the recovery of braking energy and increasing the peak performance of the rolling stock, the use of the battery storage system allows a reduction in the sizing of the nominal power of the engine-generator 6 compared to a vehicle with an energy management system in known form.

Furthermore, since the electric generator is keyed onto the shaft of the combustion engine and using the AC/DC converter as an inverter, the brushless starter motor of the combustion engine present in normal diesel trains can be eliminated. This feature allows to obtain a significant increase in the reliability of the engine-generator itself, as well as the frequency of possible starts and stops, usually linked to the overheating of the ancillary brushless motor. Said strong point allows the implementation of the PLATFORM function, which requires the engine-generator to be switched off and then switched on again.

Finally, it is clear that modifications and variations may be made to what is described and illustrated herein without thereby departing from the scope of the present invention, as defined in the attached claims.

In particular, pantograph 2 represents an energy collector that is operating even when the vehicle 100 is in motion and could be defined by a skid or wheel to draw energy from a grounded or laterally arranged track, rather than an overhead line; and/or the generator set, or engine-generator, 6 can be replaced by one or more fuel cells or by one or more hydrogen cells; in this case, the bidirectional AC/DC converter 7 is replaced with a unidirectional DC/DC converter since the fuel cell, different from the battery, is not a device in which the power flow can be bidirectional.

The invention claimed is:

1. An electric traction vehicle (100) comprising:
  a plurality of wheels (103);
  at least one electric traction chain comprising at least one electric motor (3b), mechanically coupled to at least one of said wheels to supply a driving torque;
  an energy management system (20; 40) of said electric traction chain (3), the energy management system comprising:
    a) a power bus (1);
    b) a network power collector (2) suitable to electrically couple the power bus (1) to a network power line (104), which is external to the vehicle and, in use, is designed to provide a network supply voltage ($V_{AL}$) to the power bus (1) even when the vehicle (100) is moving;
    c) a first energy source (6), which is arranged on-board and comprises one from among: a generator set, an engine-generator, a fuel cell, a hydrogen cell, said first energy source (6) being suitable to be electrically coupled to the power bus (1) to power the power bus (1) with a first supply voltage;
    d) an on-board energy storage system (21) suitable to be electrically coupled to the power bus (1) and comprising a storage assembly (21) to power the power bus (1) with a second supply voltage and to receive a recharge voltage or current from the power bus (1);
e) a plurality of switches comprising:
(1) a second switch (K2) electrically coupled between the network power collector (2) and the power bus (1);
(2) a fourth switch (K5) electrically coupled between the storage system and the power bus (1); and
f) a management and control unit (102, 30), operatively coupled to said plurality of switches
wherein
said first energy source is mechanically disconnected from said plurality of wheels (103) and from said electric motor (3b) in every operating condition;
said plurality of switches comprises:
(1) a first switch (K1) electrically coupled between the first energy source (6) and the power bus (1);
(2) a third switch (K3) electrically coupled between the electric traction chain (3) and the power bus (1);
said management and control unit (102, 30) controls said first, second, third and fourth switches to electrically couple/decouple said first energy source (6), said network power collector (2), said electric traction chain (3) and said storage system to/from the power bus (1) so as to implement a plurality of operative conditions of the vehicle (100);
and wherein said plurality of operative conditions of the vehicle (100) include a first and a second operative condition of traction, and wherein:
a) in the first operative condition of traction, the first energy source (6) and the network power collector (2) are decoupled from the power bus (1), while the storage system and the electric traction chain (3) are coupled to the power bus (1), so that the electric traction chain (3) is powered through a first intermediate voltage correlated with the second supply voltage; and
b) in the second operative condition of traction, the network power collector (2) is decoupled from the power bus (1), while the first energy source (6), the storage system and the electric traction chain (3) are coupled to the power bus (1), so that the electric traction chain (3) is powered through a second intermediate voltage correlated with the first and the second supply voltages, so as to power the traction chain (3) by drawing an aliquot of power from the first energy source (6) and a further aliquot of power from the storage system.

2. The vehicle according to claim 1, wherein the management and control unit (102, 30) is configured to switch from the first operative condition of traction to the second operative condition of traction when the vehicle goes above a further threshold forward speed.

3. The vehicle according to claim 1, wherein the management and control unit (102, 30) switches from the second operative condition of traction to the first operative condition of traction when the vehicle goes below a threshold forward speed.

4. The vehicle according to claim 1, wherein in the second operative condition of traction the management and control unit (102, 30) decreases said further aliquot of power from the storage system and simultaneously increase said aliquot of power from the first energy source (6) so as to meet the supply of a power that is demanded by said electric traction chain (3) and any possible auxiliary users, until a further operative condition of traction is reached wherein the traction chain (3) is supplied only by the first energy source (6).

5. The vehicle according to claim 1, wherein the management and control unit (102, 30) decreases the power supplied from the storage system to the power bus (1) when the first switch (K1) is closed to switch from the first to the second operative condition of traction, in order to compensate for an increase in power supplied to the power bus (1), due to the coupling of the first power source (6).

6. The vehicle according to claim 1, wherein said plurality of operative conditions of the vehicle (100) include a first, a second and a third operative condition of charging, as alternatives to each other, and wherein:
in the first operative condition of charging, the first energy source (6) is decoupled from the power bus (1), while the network power collector (2), the storage system and the electric traction chain (3) are coupled to the power bus (1), so that the storage assembly (21, 22) is recharged by a first recharge voltage correlated with the network supply voltage ($V_{AL}$); and
in the second operative condition of charging, the network power collector (2) is decoupled from the power bus (1), while the first energy source (6), the storage system and the electric traction chain (3) are coupled to the power bus (1), so that the storage assembly (21) is recharged by a second recharge voltage correlated with the first supply voltage; and
in the third operative condition of charging, the network power collector (2) and the first energy source (6) are decoupled from the power bus (1), while the storage system and the electric traction chain (3) are coupled to the power bus (1), so that the storage assembly (21) is recharged by a third recharge voltage correlated with a recovered voltage generated by the traction chain (3) operating as an electric generator.

7. The vehicle according to claim 1, wherein said plurality of operative conditions of the vehicle (100) include a first and a second operative condition of charging in the case of a halted or parked vehicle, as alternatives to each other, and wherein:
in the first operative condition of charging in the case of a halted or parked vehicle, said first energy source (6) and said electric traction chain (3) are decoupled from the power bus (1), while the network power collector (2) and the storage system are coupled to the power bus (1), so that the storage assembly (21) is recharged by means of a third recharge voltage correlated with the network supply voltage ($V_{AL}$); and
in the second operative condition of charging in the case of a halted or parked vehicle, the network power collector (2) and the electric traction chain (3) are decoupled from the power bus (1), while the first energy source (6) and the storage system are coupled to the power bus (1), so that the storage assembly (21) is recharged by a fourth recharge voltage correlated with the first supply voltage.

8. The vehicle according to claim 1, wherein, when said vehicle (100) reaches a transit area with an air pollution emission restriction, or with a noise pollution restriction, or wherein it is desirable to switch-off the first energy source (6), the management and control unit (102, 30):
sends a switch-off signal so as to shut-off said first energy source (6) and open the first switch (K1) to decouple said first energy source (6) from the power bus (1);
activates said first operative condition of traction and maintain the first operative condition of traction as long as the vehicle (100) remains in said transit area; and when the vehicle (100) has left said transit area,
  a) sends a switch-on signal to start said first energy source (6) and
  b) closes the first switch (K1) to couple said first energy source (6) to the power bus (1), or close the second switch (K2) to couple the network power collector (2) to the power bus (1).

9. The vehicle according to claim 6, further comprising a bidirectional DC-DC converter (22) operatively arranged between the fourth switch (K5) and the storage system, wherein the bidirectional DC-DC converter (22) forms a voltage level adaptation interface between the storage system and the power bus (1), and vice versa, and:
  generates, during the first operative condition of traction, the first intermediate voltage by increasing or reducing the second supply voltage as a function of the level of voltage accepted by the traction chain (3);
  generates, during the second operative condition of traction, the second intermediate voltage by increasing or reducing the first supply voltage as a function of the level of voltage accepted by the traction chain (3);
  generates, during the first operative condition of charging, the first recharge voltage by increasing or reducing the network supply voltage ($V_{AL}$) as a function of the level of voltage accepted by the storage system;
  generates, during the second operative condition of charging, the second recharge voltage by increasing or reducing the first supply voltage as a function of the level of voltage accepted by the storage system; and
  generates, during the third operative condition of charging, the third recharge voltage by increasing or reducing the recovered voltage as a function of the level of voltage accepted by the storage system.

10. The vehicle according to claim 1, further comprising at least one auxiliary electric load (5) coupled to the power bus (1) by means of a fifth switch (K4), wherein the management and control unit (102, 30) is operatively coupled to the fifth switch and simultaneously controls the fifth switch (K4) and the fourth switch (K5) to electrically couple the auxiliary load (5) and the storage system (21) to the power bus (1) in order to power the auxiliary load (5) solely by means of said second supply voltage when the vehicle (100) is halted or parked in the absence of said first supply voltage and said network supply voltage.

11. The vehicle according to claim 1, further comprising:
  a second energy source (6) arranged on-board and comprising one from among: a generator set, an engine-generator, a fuel cell, a hydrogen cell, suitable to be electrically coupled to the power bus (1) to power the power bus (1) with a third supply voltage; and
  a sixth switch, coupled between the second energy source and the power bus (1),
wherein said management and control unit (102, 30) is operatively coupled to said sixth switch and controls said sixth switch to electrically couple/decouple said second energy source to/from the power bus (1) so as to implement a further operative condition of the vehicle (100) during which either the first switch (K1) or the sixth switch is closed, and either the first energy source or, respectively, the second energy source is activated by selecting the one having the least number of total operating hours.

12. The vehicle according to claim 1, wherein said traction chain and said energy management system are part of a first power car of said vehicle (100), and said vehicle comprises a second power car having a further traction chain and a further energy management system; and wherein said power bus is shared between said first power car (42) and said second power car (44).

13. An energy management method of the at least one electric traction chain, in the vehicle (100) according to claim 1; the method comprising the steps of selectively controlling the first, second, third and fourth switches to electrically couple/decouple said first energy source (6), said network power collector (2), said at least one electric traction chain (3) and said second energy source (21, 22) to/from the power bus (1) so as to implement the plurality of operative conditions of the vehicle (100) as defined in claim 1.

* * * * *